US007916614B2

(12) United States Patent
Harada

(10) Patent No.: US 7,916,614 B2
(45) Date of Patent: Mar. 29, 2011

(54) RECORDING MEMBER CUTTING DEVICE AND RECORDING MEMBER CUTTING PROCESSING APPARATUS

(75) Inventor: Masaaki Harada, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 569 days.

(21) Appl. No.: 12/051,929

(22) Filed: Mar. 20, 2008

(65) Prior Publication Data

US 2009/0028038 A1 Jan. 29, 2009

(30) Foreign Application Priority Data

Jul. 27, 2007 (JP) ................................ 2007-196462

(51) Int. Cl.
*G11B 3/00* (2006.01)

(52) U.S. Cl. ........................................................ 369/173

(58) Field of Classification Search .................. 369/173, 369/154, 126, 132, 130, 144, 136, 170, 171, 369/142, 127

See application file for complete search history.

(56) References Cited

U.S. PATENT DOCUMENTS 5,218,947 A * 6/1993 Ajamian .................... 125/13.02
2009/0294930 A1* 12/2009 Yoon et al. .................... 257/660

FOREIGN PATENT DOCUMENTS

JP 9-94685 A 4/1997
JP 2001-138288 A 5/2001

* cited by examiner

*Primary Examiner* — Allen T Cao
(74) *Attorney, Agent, or Firm* — Sughrue Mion, PLLC

(57) ABSTRACT

A recording member cutting device for cutting a continuous recording material along a side of a plurality of cutting areas defined in the continuous recording material includes a nick cutting mechanism, and an area cutting mechanism. The nick cutting mechanism includes a first cutting unit configured to form a hole-shaped nick for each cutting area. Each nick is located outside the plurality of the cutting areas, on a downstream side of the corresponding cutting area in the conveying direction and on a line extending along one side of the corresponding cutting area. The one side is along the conveying direction. The area cutting mechanism includes a second cutting unit configured to insert into the nick. The second cutting unit cuts, when the nick has been formed, the continuous recording material along the one side from a position of the nick.

16 Claims, 20 Drawing Sheets

RECORDING MEMBER CUTTING DEVICE AND RECORDING MEMBER CUTTING PROCESSING APPARATUS

CROSS-REFERENCE TO RELATED APPLICATIONS

This application is based on and claims priority under 35 USC 119 from Japanese Patent Application No. 2007-196462 filed Jul. 27, 2007.

TECHNICAL FIELD

The present invention relates to a recording member cutting device and a recording member cutting processing apparatus using the recording member cutting device.

RELATED ART

Conventionally, as a method for cutting a continuous sheet (an example of a continuous recording material) with images formed thereon along the width direction thereof intersecting with the conveying direction thereof, cutting the continuous sheet using a rolling type cutter or a guillotine type cutter, or a method for cutting the continuous sheet using a laser are known.

On the other hand, as a method for cutting the continuous sheet along the conveying direction thereof, a method in which continuous prepregs are heated using a laser and is softened linearly along the conveying direction thereof and, after then, a cutter is inserted into the softened portions of the prepregs to thereby cut the prepregs.

SUMMARY

According to an aspect of the invention, a recording member cutting device for cutting a continuous recording material along a side of a plurality of cutting areas defined in the continuous recording material includes a nick cutting mechanism, and an area cutting mechanism. The nick cutting mechanism includes a first cutting unit configured to move in a direction intersecting with a conveying direction of the continuous recording material and configured to form a nick for each cutting area. Each nick is located (i) outside the plurality of the cutting areas, (ii) on a downstream side of the corresponding cutting area in the conveying direction and (iii) on a line extending along one side of the corresponding cutting area. The one side is along the conveying direction. The area cutting mechanism includes a second cutting unit configured to move in a direction intersecting with the conveying direction and configured to insert into the nick. The second cutting unit cuts the continuous recording material along the one side of cutting area. And the second cutting unit cuts, when the nick has been formed, the continuous recording material along the one side from a position of the nick.

BRIEF DESCRIPTION OF THE DRAWINGS

Exemplary embodiment(s) of the present invention will be described in detail based on the following figures, wherein.

DETAILED DESCRIPTION

Firstly, description will be given below of the outline of an enforcing model to which the invention is applied.

Figure 1:
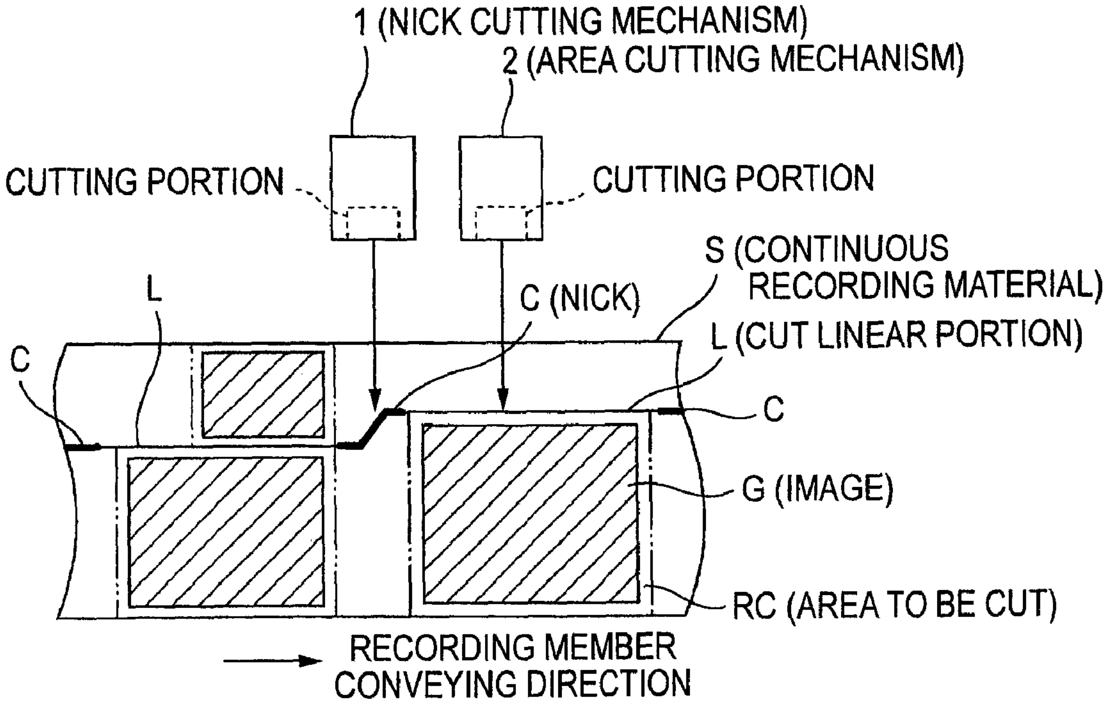
FIG. 1 is an explanatory view of the outline of a recording member cutting device according to an enforcing model for an exemplary embodiment of the invention.

FIG. 1 shows the outline of a recording member cutting device according to an enforcing model for embodying the invention.

In FIG. 1, the recording member cutting device is a device which cuts a continuously conveyed continuous recording material S along sides of the different-size cutting areas (areas to be cut) RC thereof. The side of each cutting areas RC is along the conveying direction of the recording member S. And, the recording member cutting device includes a nick cutting mechanism 1 and an area cutting mechanism 2. Specifically, the nick cutting mechanism 1 includes a cutting portion. The cutting portion is movable in a direction intersecting with the recording member conveying direction. And the cutting portion is capable of forming a hole-shaped nick C (a example of a nick) in such a portion of a non-cutting area. Each non-cutting area is disposed on a downstream side of the cutting area RC of the continuous recording material S. The nick C is on a line extending along the side of each cutting area RC. Each line is along the recording member conveying direction. On the other hand, the area cutting mechanism 2 includes a cutting portion. The cutting portion is movable in a direction intersecting with the recording member conveying direction and insertable into the nick C. And the cutting portion of the area cutting mechanisms 2 cuts side of each cutting area RC of the continuous recording material S. The side of each cutting area RC is along the recording member conveying direction. When the nick C has been formed, the cutting portion cuts such side of the cutting area RC of the continuous recording material S along the recording member conveying direction at and from the position of the nick.

Here, the numbers of the nick cutting mechanism 1 and area cutting mechanism 2 are not limited to any specific ones, but there may also be provided two or more respectively. Also, the nick C may be formed at any position extending to the downstream side from the cutting area RC. The nick C is on the line extending along the side of the cutting area RC. For example, the nick C may be formed to be in contact with the side of the cutting area RC or may be formed spaced from the side of the cutting area RC. And, when the nick C includes a portion existing along the conveying direction of the continuous recording material S, the downstream side of the nick C may not exist on the extended line of such side, but the nick C is only required to have a length which allows the cutting portion of the area cutting mechanism 2 to be inserted into a portion formed on the extended line. Further, cutting information may be transmitted to at least the recording member cutting device. The cutting information indicates the forming position of the range of the nick to be formed by the nick cutting mechanism 1 and the forming position of the range of the cut portion to be formed on a straight line along the above side (which is called the cut linear portion L for short) by the area cutting mechanism 2. For example, the cutting information may be obtained in such a manner that a mark corresponding to an image G is formed on the continuous recording material S and the mark is detected by the recording member cutting device; or, the cutting information may be transmitted from other devices directly to the recording member cutting device. Also, the area cutting mechanism 2 may only be structured such that it can start its cutting operation at a position where the nick C has been formed by the nick cutting mechanism 1, and the area cutting mechanism 2 may also be applied to a portion where the nick C is not formed.

Still further, after the nick C and cut linear portion L are formed, the method of carrying out the cutting operation, in which the cutting area RC is cut from the continuous recording material S in the direction intersecting with the recording member conveying direction, is not limited to any specific method, but the cutting area RC may be cut properly using a cutting blade or the like. By the way, the term "the cutting area RC" means an area that is to be cut from the continuous recording material S for each size. Although there is no direct relationship between the cutting area RC and image G, the cutting area RC may be identical with the area of the image G, or may be considerably larger in size than the area of the image G, or, reversely, may be smaller than the area of the image G.

Also, referring to the description that the cutting portion of the nick cutting mechanism 1 "is movable in the direction intersecting with the recording material conveying direction", the nick cutting mechanism 1 itself may be formed to be movable; or, for example, as the cutting portion of the nick cutting mechanism 1, there may be used a laser, and the laser may be moved to thereby be able to form the nicks C at the different positions of the continuous recording material S in the direction intersecting with the recording material conveying direction. However, from the viewpoint of simplifying the structure of the device, the nick cutting mechanism 1 itself may be formed movable.

As the nick cutting mechanism 1, there are available a laser method and a water jet method which are capable of easily forming the nicks C in the continuous recording material S. However, in order to simplify the structure of the device, the cutting portion of the nick cutting mechanism 1 may be structured such that it cuts and forms the nicks C using a laser disposed spaced from the continuous recording material S being conveyed.

And, in order to facilitate the cutting of the cutting area RC of the continuous recording material S, a cutting locus formed by the range of the nick and a cutting locus formed by the range of the cut linear portion L, may be alternately connected to each other to thereby provide a continuous cutting locus toward the recording member conveying direction. Such continuous cutting locus makes it possible to cut and divide the continuous recording material S in the width direction, thereby being able to facilitate the cutting operation to be executed after then, that is, the operation to cut the cutting area RC along the side thereof intersecting with the recording member conveying direction. By the way, use of such cutting locus can cut and divide the continuous recording material S into two or more. In this case, however, the cutting locus itself may not always extend continuously up to the terminal end of the continuous recording material S but, for example, the cutting locus may also extend, in the vicinity of the terminal end of the continuous recording material S, toward the side edge of the continuous recording material S in the direction intersecting with the conveying direction thereof.

Also, as an exemplary embodiment of the cutting portion of the area cutting mechanism 2, there is available an embodiment using a blade such as a cutting blade or a round blade. In order to eliminate not only the need to increase the length of a nick along the recording member conveying direction unnecessarily but also the need for rotational driving, the cutting portion of the area cutting mechanism 2 may be a cutting blade which moves back and forth between a retreat position spaced from the continuous recording material S being conveyed and an advance position for cutting the continuous recording material S while straddling it. Here, the cutting blade means an ordinary knife-like blade.

Further, in order to keep the continuous recording material S in a proper attitude when it is cut by the area cutting mechanism 2, there may be provided an opposed member which not only touches the continuous recording material S on the surface thereof different from the side of the cutting blade retreated relative to the continuous recording material S but also is disposed along a direction intersecting with the recording member conveying direction. Further, in the vicinity of the continuous recording material S being conveyed, there may be provided a stop member which can prevent the continuous recording material S from floating up due to the advancing and retreating movement of the cutting blade.

Moreover, in an exemplary embodiment in which such sides of plural cutting areas RC lined up in the conveying direction of the continuous recording materials S are continuously lined up on a straight line, in order to cut the cutting areas RC continuously on a straight line, the area cutting mechanism 2 may be structured such that it may continuously cut such sides of the plural cutting areas RC as lined up on a straight line along the recording member conveying direction with no intervention of the nicks C formed by the nick cutting mechanism 1.

And, as a recording member cutting processing apparatus, which cuts the continuous recording material S into recording members S of sizes respectively corresponding to the cutting areas RC using the above-structured recording member cutting device, there may be employed a recording member cutting processing apparatus which has the following structure.

Figure 2:
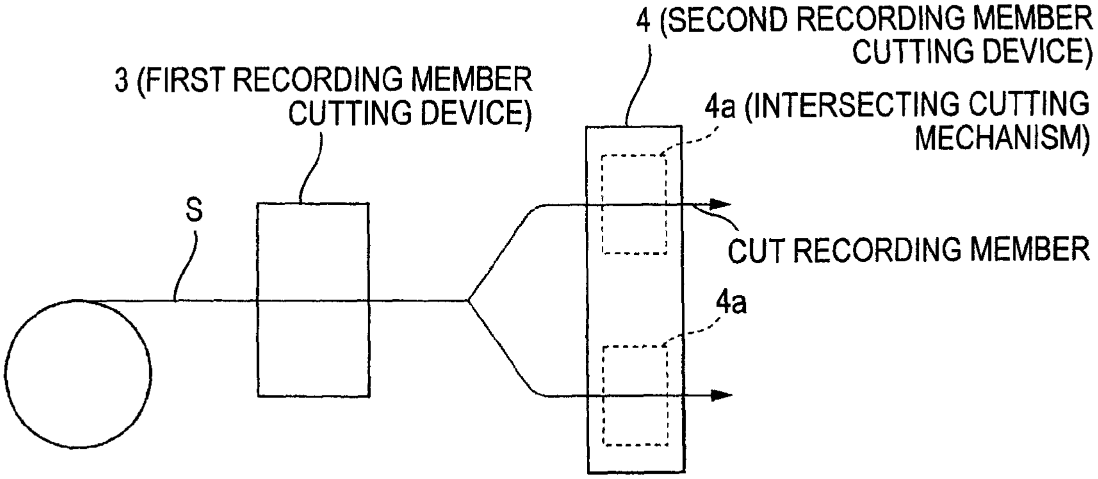
FIG. 2 is an explanatory view of a recording member cutting processing apparatus according to the enforcing model.

That is, as shown in FIG. 2, there may be provided a recording member cutting processing apparatus which cuts the cutting areas RC of the continuously conveyed continuous recording material S, the sizes of the cutting areas RC to be cut differing from each other. Specifically, the recording member cutting processing apparatus may include a first recording member cutting device 3 and the second recording member cutting device 4. The first recording member cutting device 3 cuts side of each cutting area RC of the continuous recording material S. Such side of each cutting area RC is along the conveying direction of the continuous recording material S. The second recording member cutting device 4 is disposed downstream of the first recording member cutting device 3 in the recording member conveying direction. The second recording member cutting device 4 cuts sides of each cutting area RC to thereby provide cut recording members. Such side of each cutting area RC is in a direction intersecting with the side cut by the first recording member cutting device 3. Here, the first recording member cutting device 3 may include a nick cutting mechanism 1 and an area cutting mechanism 2. More specifically, the nick cutting mechanism 1 may include a cutting portion movable in a direction intersecting with the conveying direction of the continuous recording material. And the cutting portion of the nick cutting mechanism 1 is capable of forming a hole-shaped nick C. Each nick C is in the area that exists outside and downstream of the cutting area RC of the continuous recording material S. the nick C is on a line extending along such side of each cutting area RC. The line is along the recording member conveying direction. On the other hand, the area cutting mechanism 2 may include a cutting portion movable in a direction intersecting with the conveying direction of the continuous recording material S and insertable into the nick C. And the cutting portion of the area cutting mechanism 2 is capable of cutting such side of each cutting area RC of the continuous recording material S. such side of each cutting area RC is along the recording member conveying direction. And when the nick C has been formed, the cutting portion cuts such side of the cutting area RC of the continuous recording material S, at and from the position of the nick C, such side is along the conveying direction of the continuous recording material.

And, in order that, while the continuous recording material S cut by the first recording member cutting device 3 remains as it is, the second recording member cutting device is able to easily cut the cutting area RC to thereby provide a cut recording member, the first recording member cutting device 3 may be structured such that the cutting locus of the range of the nick cut by the nick cutting mechanism 1 and the cutting locus of the side of the cutting area RC on a straight line cut by the area cutting mechanism 2 are continuously connected together alternately in the recording member conveying direction to provide a continuous locus; and, the second recording member cutting device 4 may include plural intersecting cutting mechanisms 4*a* which are provided in the individual cut recording members cut and divided in a direction intersecting with the conveying direction of the continuous recording materials S according to the continuous locus, and the respective intersecting cutting mechanisms also are capable of cutting such sides of the individual cut recording members as intersecting with the divisionally cutting direction of the individual cut recording members. Here, the number of cutting loci continuously connected in the conveying direction of the continuous recording material provided by the first recording member cutting device 3 is not limited to a specific number, but, normally, there is provided a single locus and the continuous recording material S is cut and divided to two with respect to the width direction thereof.

Also, as the second recording member cutting device 4, there can be used any type of cutting device, provided that it is able to cut such side of the cutting area as intersecting with the conveying direction of the continuous recording material. For example, there are available a guillotine type cutter and a rotary type cutter.

And, in order to allow the second recording member cutting device 4 to carry out its cutting operation stably, the second recording member cutting device 4 may include a temporary stop mechanism for temporarily stopping the continuous recording material S being conveyed, and may cut the continuous recording material S along such side thereof as intersecting with the conveying direction under the condition that the continuous recording material S is stopped by the temporary stop mechanism.

Here, the cutting operations to be executed by the first and second recording member cutting devices 3 and 4 in the recording member cutting processing apparatus may be carried out, for example, by applying a mark corresponding to an image to the continuous recording material S and detecting the mark, or by using a control signal to be issued from outside the apparatus (e.g., a control signal based on an image signal). However, in order to operate the recording member cutting processing apparatus alone, in an embodiment for cutting the continuous recording material S with a mark applied according to the cutting area RC, there may be further provided a mark detector for detecting the mark of the continuous recording material S, and the first and second recording member cutting devices 3 and 4 may execute their respective cutting operations based on the mark detect information of the continuous recording material S provided by the mark detector.

Also, in order to be able to carry out such cutting operation as can finish properly the entire periphery of finally cut each individual recording member S (cut recording member), the first recording member cutting device 3 may include plural nick cutting mechanisms 1 and area cutting mechanisms 2 respectively existing in a direction intersecting with the conveying direction of the continuous recording material S; the cutting locus of the range of the nick cut by a nick cutting mechanism 1 disposed near to the intersecting direction side edge of the continuous recording material S being conveyed and the cutting locus of the range of the area cut on a straight line by an area cutting mechanism 2 respectively may provide discontinuous loci which are divided halfway toward the recording member conveying direction; and, the cutting locus of the range of a nick cut and formed by the nick cutting mechanism 1 disposed in other portion than the intersecting direction side edge neighboring portion and the cutting locus of the range of the area cut on a straight line by the area cutting mechanism 2 may be continuously connected to each other alternately toward the recording member conveying direction to thereby provide a continuous cutting locus.

Further, when such sides of plural cutting areas RC lined up in the conveying direction of the continuous recording materials S as existing along the recording member conveying direction are arranged to line up on a straight line toward the conveying direction of the continuous recording material S, in order to continuously cut the cutting areas RC along such sides, the area cutting mechanism 2 may be able to cut continuously such sides of the plural cutting areas RC lined up on a straight line along recording member conveying direction with no intervention of the nicks C cut by the nick cutting mechanism 1.

And, when, such sides of plural cutting areas RC lined up in the conveying direction of the continuous recording materials S as existing along the recording member conveying direction are arranged to line up on a straight line from the conveying direction of the continuous recording material most upstream side of the continuous recording materials S to the most downstream side thereof, the area cutting mechanism 2 may be able to cut continuously such sides of the plural cutting areas RC as lined up on a straight line along the recording member conveying direction. By the way, for example, the nick C may also be formed on the most upstream side and the sides of the cutting areas RC may be cut continuously at and from the position of the nick C using the area cutting mechanism 2. Here, the most upstream side of the conveying direction includes the start point of one continuous recording material cutting job, and the most downstream side of the continuous recording material includes the end point of the continuous recording material cutting job.

Alternatively, the recording member cutting processing apparatus may also include an image forming portion for forming an image on the continuous recording material S. In this case, the image forming portion may be structured such that it may form an image on the continuous recording material S on the more upstream side than the first recording member cutting device 3 in the conveying direction of the continuous recording material S. Also, when forming an image in order to provide a well finished cut portion, the image forming portion may be structured such that, excepting image non-forming areas respectively extending over the entire area of the continuous recording material S in the width direction thereof intersecting with the conveying direction thereof, the areas of the continuous recording material S respectively intervening between the mutually adjoining ones of the image non-forming areas in the recording member conveying direction may be used as image forming areas. Here, the expression "over the width direction intersecting at right angles to the recording member conveying direction" contains not only the width direction of the continuous recording material S but also a direction intersecting with the recording member conveying direction so as to be able to apply even to a case where the cutting area RC is formed in a parallelogram. In other words, the image non-forming area may extend over the entire width of the continuous recording material S.

Now, description will be given below in detail of the invention with reference to exemplary embodiments respectively shown in the accompanying drawings.

Figure 3:
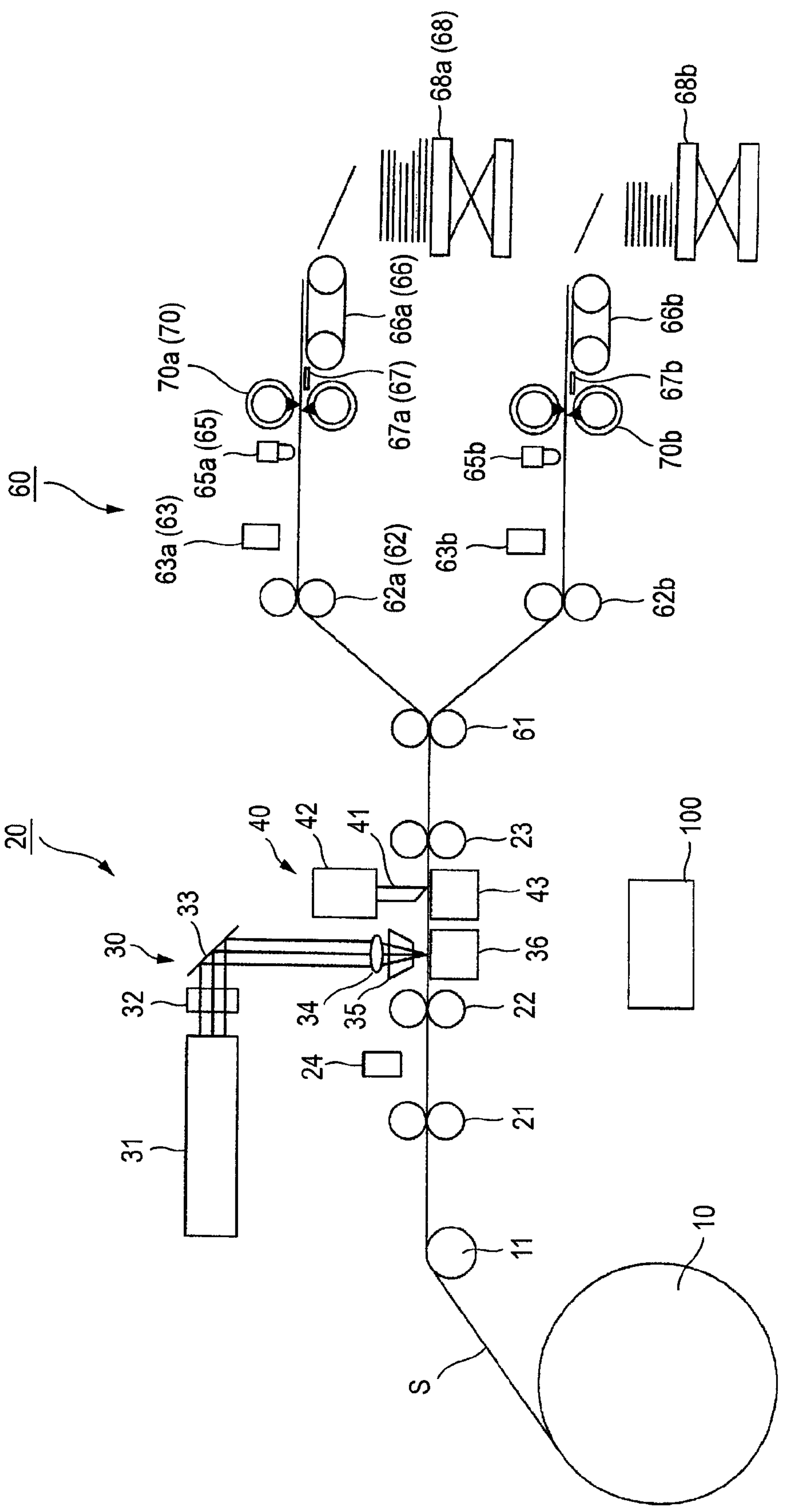
FIG. 3 is an explanatory view of a recording member cutting processing apparatus according to an first exemplary embodiment of the invention.

FIG. 3 shows an first exemplary embodiment of a recording member cutting processing apparatus according to the invention. In FIG. 3, the recording member cutting processing apparatus according to the first exemplary embodiment is a so called on-demand variable type recording member cutting processing apparatus which cuts the size-different cutting portions of a continuous recording material S into cutting portions of a desired size to thereby produce recording members S of a given size. In order to attain the above object, the present recording member cutting processing apparatus is composed of first and second recording member cutting devices 20 and 60. Specifically, cutting linear portion L of the first recording member cutting device 20 forms, in the continuous recording material S, a cutting locus continuously extending along a recording member conveying direction (which is hereinafter referred to as a conveying direction simply). And the first recording member cutting device 20 cuts and divides a continuous recording material S into two in the width direction. The width direction is perpendicular to the conveying direction. And, the second recording member cutting device 60 is disposed on a downstream side of the first recording member cutting device 20 in the conveying direction, and includes two intersecting cutting mechanisms for cutting such cutting portion of the continuous recording material S divided by the first recording member cutting device 20 along the width direction of the continuous recording material S, to thereby produce a cut recording member S. Here, the width direction is an example of a direction intersecting with the conveying direction. By the way, according to the first exemplary embodiment, the number of sections to be divided by the first recording member cutting device 20 is set for two, but the number is not limited to any specific one.

The continuous recording material S (which may also be hereinafter referred to as a recording member S according to cases) according to the first exemplary embodiment is a roll-shaped recording member 10 wound in a roll-like manner. On the recording member S, there have been previously formed images respectively having different sizes and marks provided in the width direction end portions of the recording member 10 in correspondence to the images. And the continuous recording material S can be conveyed through an idler 11 to the first recording member cutting device 20.

The first recording member cutting device 20 includes plural convey rollers 21 to 23 capable of conveying the continuous recording material S, a laser radiating device 30 functioning as a nick cutting mechanism for forming a nick in the continuous recording material S, a cutting blade device 40 disposed on a downstream side of the laser radiating device 30 and functioning as an area cutting mechanism, and a mark detector 24 disposed on an upstream side of the laser radiating device 30 and facing a recording member convey passage for detecting the mark formed on the continuous recording material S. According to the exemplary embodiment, there are shown the three convey rollers 21 to 23 which are respectively disposed at three portions, however, this is not limitative. In addition, there can also be employed a structure which does not use any convey roller, provided that it is capable of conveying the continuous recording material S. For example, there can also be employed a perforation type structure which conveys a continuous recording material S with a hole opened up in the side edge portion thereof using a tractor or the like.

Here, the laser radiating device 30 has an optical system. And, the optical system includes a laser oscillator 31, an electronic type optical shutter 32 that turns on/off a laser beam emitted from the laser oscillator 31, a reflecting mirror 33 that reflects the laser beam after it has passed through the optical shutter 32, a condensing lens 34 that collects the reflected laser beam, and the like. Also, the laser radiating device 30 further includes: an air nozzle 35 and a suction table 36. The air nozzle 35 is disposed facing a recording member convey passage.

The air nozzle 35 blows off gas components generated by the instantaneous vaporization of the recording member S due to high temperatures when forming a nick in the continuous recording material S, thereby preventing the recording member S and condensing lens 34 against contamination. The suction table 36 is disposed on the opposite side of the recording member convey passage in such a manner that it is opposed to the air nozzle 35 and extends over the entire area of the recording member in the width direction thereof to suck gas components generated in the nick forming operation. That is, using a pump (not shown) or the like, clean air is supplied from the air nozzle 35 to thereby clean the laser radiating device 30 in the recording member cutting operation. The whole of the laser radiating device 30, except for the suction table 36, can be moved in a direction substantially perpendicular to the conveying direction by a motor (not shown) or the like. Also, according to the first exemplary embodiment, since the continuous recording material S is held in a tense state by the convey rollers 22, 23, the focus of the laser beam in the laser radiating device 30 can be set at such height that allows proper formation of a nick in the recording member S.

Also, the cutting blade device 40 includes a cutting blade 41 that has an edge shape in which an edge is provided so as to extend obliquely downward toward downstream with respect to the recording member convey passage, a moving device 42 such as a solenoid that moves the cutting blade 41 in the vertical direction, a cutting table 43 that is disposed on the opposite side of the recording member convey passage and supports the recording member S in contact therewith in the cutting operation, and the like.

Figure 4A:
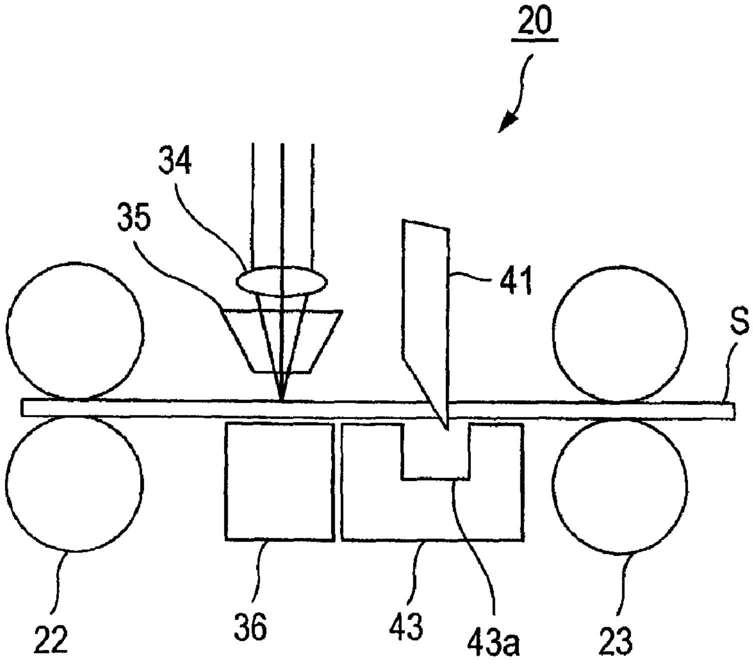
FIG. 4A is a partially explanatory view of a first recording member cutting device according to the first exemplary embodiment.
Figure 4B:
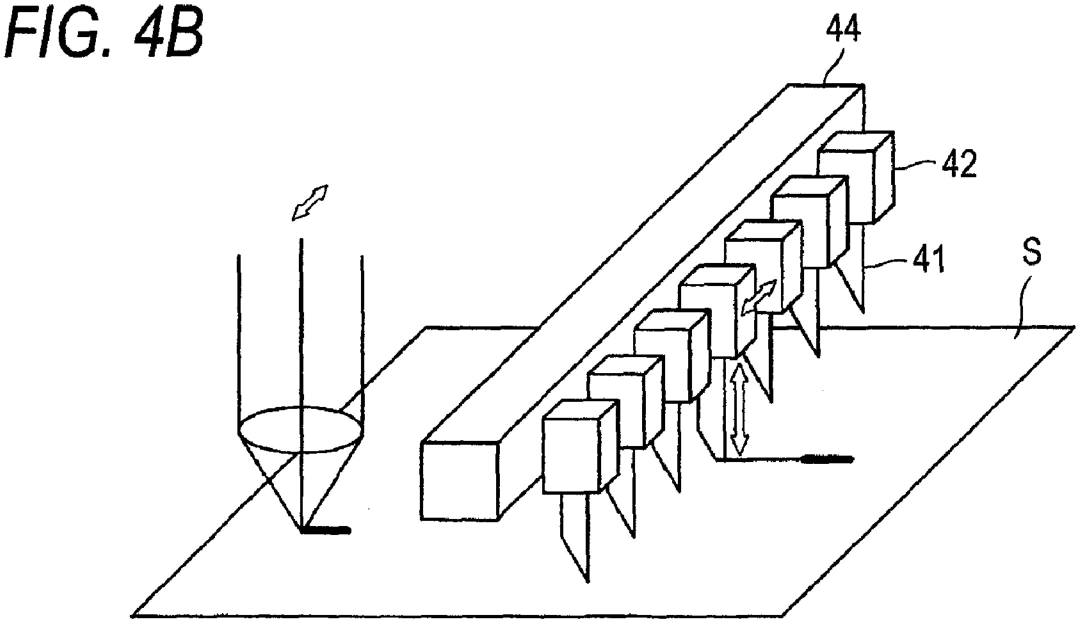
FIG. 4B is a partially perspective view of the first recording member cutting device shown in FIG. 4A.

Now, FIG. 4A shows the portions of the first recording member cutting device 20. FIG. 4B shows not only a portion of the laser radiating device 30 of the first recording member cutting device 20 but also a portion of the cutting blade device 40, when they are viewed from obliquely above. As shown in these figures, the cutting blade device 40 according to the first exemplary embodiment includes plural cutting blades 41 arranged along the width direction of the recording member S, each cutting blades 41 include moving device 42 respectively for moving their associated cutting blades 41 in the vertical direction, and the fixing portion of each moving devices 42 is fixed to a support member 44 which extends in the width direction of the recording member S. And, the support member 44 is structured such that it can be moved along the width direction of the recording member S by a motor (not shown) or the like. Therefore, according to this structure, when the cutting blade 41 situated near to the cutting position is selected and the support member 44 is moved, the selected cutting blade 41 can be moved from its home position to a given cutting position. After then, by moving the cutting blade 41 in the vertical direction using the moving device 42, the cutting blade 41 can be moved between its retreat position, in which the cutting blade 41 is retreated more upwardly of the recording member S, and its advance position in which it straddles the recording member S. And, at the advance position, the cutting blade 41 is allowed to cut the recording member S. Also, according to the first exemplary embodiment, in the cutting table 43, there is formed a recessed portion 43*a* in correspondence to the plural cutting blades 41. Owing to this, when the cutting blade 41 arrives at the advance position, there exists no obstacle to the operation of the cutting blade 41 and also the stability of the recording member S in the cutting operation can be secured.

Accordingly, in the first recording member cutting device 20, since the mark of the continuous recording material S is detected by the mark detector 24, according to the thus obtained mark detect information, not only the laser radiating device 30 can form a nick but also the cutting blade device 40 can cut along such side of the continuous recording material S that is in the conveying direction. According to the first exemplary embodiment, there is shown a structure in which the mark detector 24 is disposed upwardly of the recording member convey passage. The reason for employment of this structure is that the mark is formed on the surface side of the roll-shaped recording member 10 wound in a roll manner. For example, suppose that the mark detector 24 is disposed in the vertical direction at a position where it straddles the recording member convey passage, even when a resist mark (which will be discussed later) or the like is formed on the back surface of the recording member, not only the mark detector 24 is able to cope with the resist mark easily but also the freedom of the mark forming surface can be enhanced.

Here, description will be given of the mark. The mark according to the first exemplary embodiment, as shown in FIG. 9 (which will be discussed later), is formed substantially at a similar position to the leading end position of an image with respect to the conveying direction. As the mark, for example, there can be effectively used a bar code to which there are applied necessary pieces of cutting information (information about the cutting areas) respectively corresponding to their associated images. Specifically, by detecting the bar code using the mark detector 24, there can be decided positions where the laser radiating device 30 and cutting blade device 40 can carry out their respective cutting operations. Here, the mark may also be formed for each individual image, or a single mark may be used to represent plural images in bulk.

As the mark, besides the above-mentioned cutting information mark, for example, there may be formed at the head position of the continuous recording material S an ID mark which corresponds to the content of a mark to be formed; and, the ID mark may be composed of alphanumeric information and may be read using an OCR. However, normally, there is used the bar code. And, by detecting the bar code using the mark detector 24, cutting information corresponding to an image may be obtained. Also, as the need arises, as a reference for matching the cutting positions, a resist mark may also be formed in combination with the cutting information mark or ID mark, or the cutting information mark or ID mark may also be used in combination with the resist mark.

Alternatively, the detect information obtained by the mark detector 24 may also be processed externally of the recording member cutting processing apparatus. In this case, for example, after the detect information is sent to a print server or an information terminal connected to the recording member cutting processing apparatus, there may be obtained the cutting information from the print server or information terminal and the continuous recording material S may be cut according to the image that is specified by the cutting information.

On the other hand, in the second recording member cutting device 60, as shown in FIG. 3, the continuous recording material S, which has been divided into two sections by the first recording member cutting device 20, is separated downstream of convey rollers 61 into two passages, that is, a recording member convey passage going upward and a recording member convey passage going downward. Here, the two recording member convey passages are structured substantially in the same manner. That is, the recording member S, which has been conveyed obliquely from the convey rollers 61, is conveyed substantially horizontally by convey rollers 62 (62*a*, 62*b*) and, according to the mark detect information read by mark detectors 63 (63*a*, 63*b*), the recording member S is cut along the width direction thereof by cross cutters (70*a*, 70*b*). And, the thus cut recording member S is then conveyed by a convey belt 66 (66*a*, 66*b*) and is stored into a recording member storage portion 68 (68*a*, 68*b*).

Here, reference numeral 65 (65*a*, 65*b*) designates a temporary stop member which is used to temporarily stop the recording member S when the recording member S is cut by the cross cutters 70. The temporary stop member 65 can be moved in the vertical direction by a solenoid (not shown) or the like. According to the detect information provided from the mark detector 63, the temporary stop member 65 stops temporarily the movement of the recording member S in this position at a given timing, thereby allowing the cutting operation by the cross cutters 70 to be executed properly in the recording member width direction.

Figure 5A:
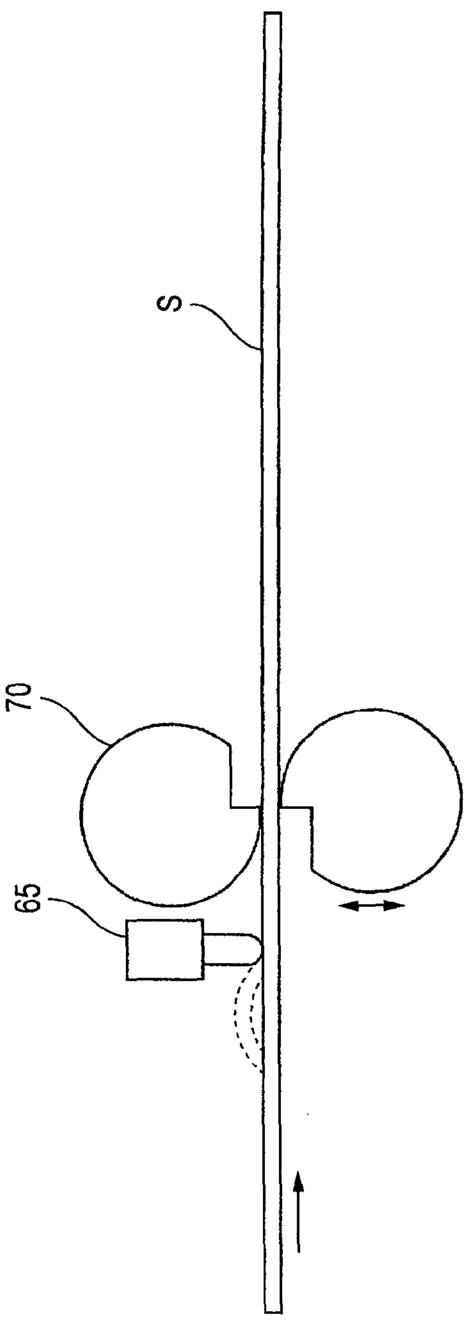
FIG. 5A is an explanatory view of the operation of a temporary stop member provided in a second recording member cutting device according to the first exemplary embodiment.

In other words, the temporary stop member 65 according to the first exemplary embodiment, as shown in FIG. 5A, is disposed on an upstream side of the cross cutters 70 and is structured such that it can stop temporarily the recording member S being conveyed at a given timing and allows the cross cutters 70 to cut the recording member S in the width direction thereof at the temporarily stopped timing. Therefore, as shown by dotted lines in FIG. 5, when the temporary stop member 65 is operated, upstream of the temporary stop member 65, there is generated a loose portion in the recording member S. However, when the temporary stop member 65 is released from its operating condition, the leading end position of the recording member S provides the cutting position of the cross cutters 70. Thus, Shortness of the length from the position where the recording member S has been temporarily stopped by the temporary stop member 65, to the leading end of the recording member S is effective to release the loose portion formed on the recording member S, whereby the loose portion can be extended sufficiently due to the strength of the recording member S itself and can be prevented from having ill influences such as causing wrinkles on the cut recording member S.

Figure 5B:
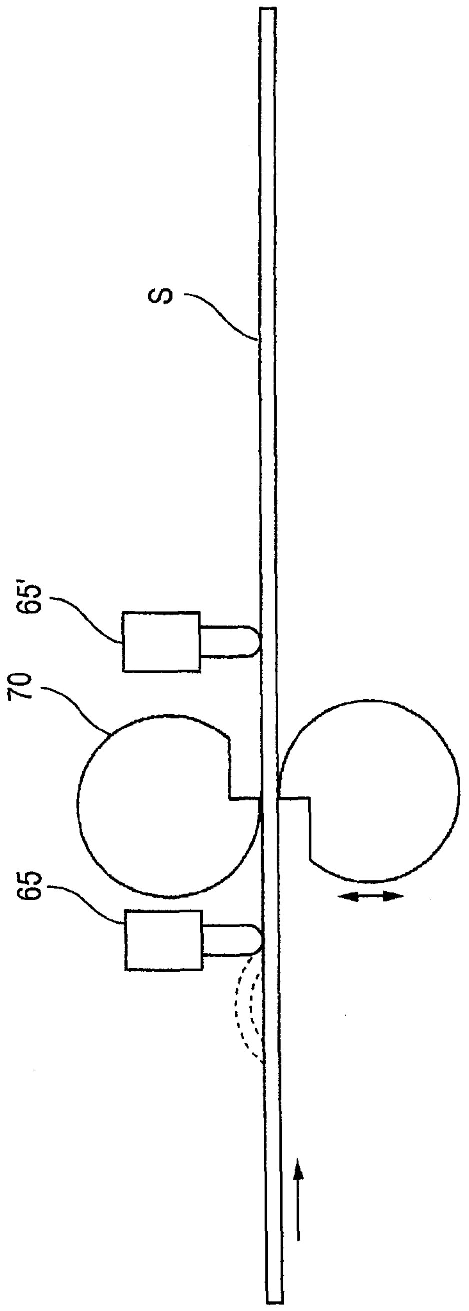
FIG. 5B is an explanatory view of the operation of a modification of the temporary stop member shown in FIG. 5A.

Also, FIG. 5B shows a modification of the first exemplary embodiment, in which, in order to enhance further the stability of the recording member S when it is cut by the cross cutters 70, there is further provided another temporary stop member 65' also on a downstream side of the cross cutters 70. When the temporary stop members are arranged in this manner, the recording member S can be cut by the cross cutters 70 in a tensioned state, which can further enhance the cutting precision and finishing.

Also, reference numeral 67 (67*a*, 67*b*) shown in FIG. 3 designates a shutter. The shutter does not convey a cut trash to the recording member storage portion 68 side but stores it into a storage device (not shown). The cut trash has no image formed thereon of the recording member S which is cut along the width direction by the cross cutters 70. Specifically, by opening and shutting the shutter 67, it can be switched whether the cut sheet-shaped recording member S is conveyed to the convey belt 66 side or is dropped down into a cut trash box (not shown). By the way, of course, when cutting the divided recording member S using the cross cutters 70, in order to secure the deliverability of the recording member S to thereby convey the recording member S in a sufficiently tensioned state, there may also be interposed, for example, a tension adjusting member or the like between the convey rollers 61 and 62.

And, in FIG. 3, there is also shown a control unit 100 which executes various controls in the above-mentioned recording member cutting processing apparatus.

Figure 6:
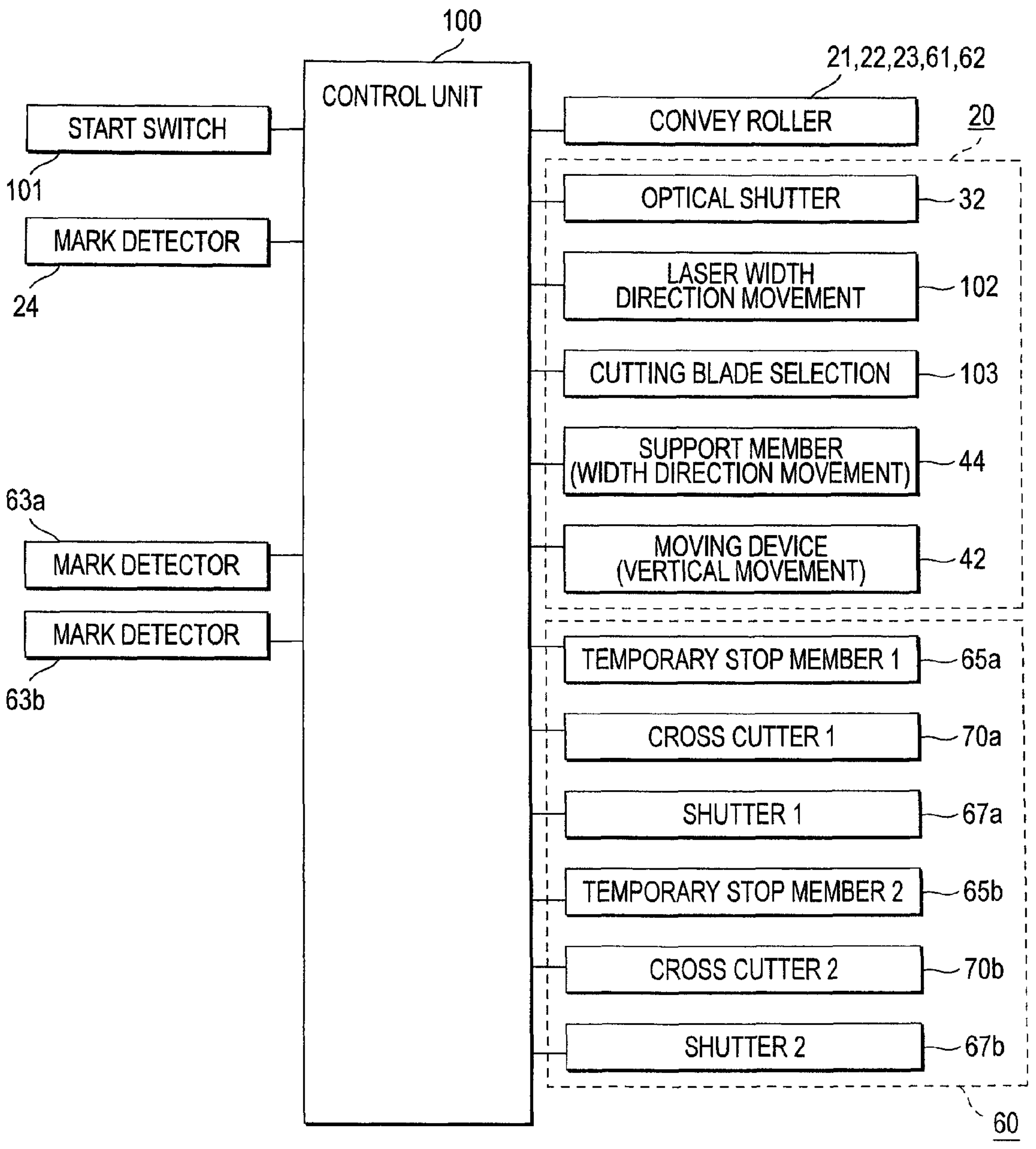
FIG. 6 is a block diagram of a control system according to the first exemplary embodiment.

Now, description will be given below of the above control system of the recording member cutting processing apparatus with reference to a control block shown in FIG. 6. That is, on the input side of the control unit 100, there is set, in the present cutting member cutting processing apparatus, a roll-shaped recording member 10 wound on a roll; and also, to the input side of the control unit 100, there are connected a start switch 101 (which is not shown in FIG. 6) to be actuated when starting the cutting of the recording member 10, the mark detector 24 of the first recording member cutting device 20, the mark detectors 63*a*, 63*b* of the second recording member cutting device 60, and the like. Based on input information from these elements, the control unit 100 executes the following output controls according to the cutting positions.

Firstly, referring to the operation of the recording member cutting processing apparatus, the driving of the convey rollers 21, 22, 23, 61, 62 is controlled.

Also, in the first recording member cutting device 20, not only the driving of the optical shutter 32 that turns on/off a laser beam in the laser radiating device 30 (including the on/off of the laser oscillator 31) but also the width direction movement 102 of the laser radiating device 30 to the nick position are controlled. On the other hand, in the cutting blade device 40, the selection 103 of the cutting blade 41 existing near to the cutting position, the width direction movement of the cutting blade 41 to the cutting position by a support member 44, the vertical motion of the cutting blade 41 by the moving device 42 and the like, are controlled.

Further, in the second recording member cutting device 60, the driving of the two temporary stop members 65*a*, 65*b*, the driving of the cross cutters 70*a*, 70*b*, the opening and closing of the shutters 67*a*, 67*b* and the like, are controlled.

Figure 7:
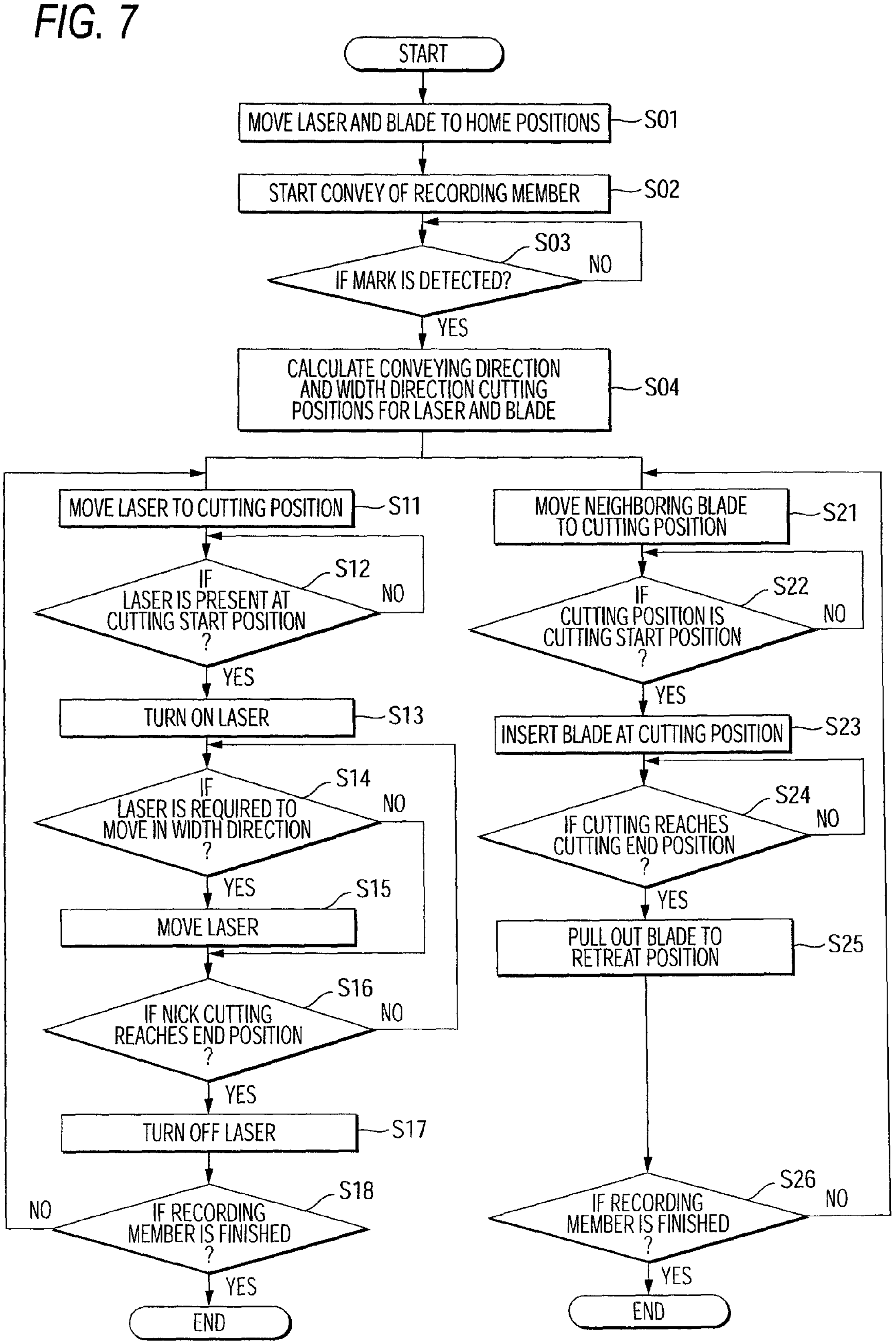
FIG. 7 is a flow chart of processing to be executed by the first recording member cutting device according to the first exemplary embodiment.

Next, description will be given below of specific flows in the above control system with reference to FIGS. 7 and 8. FIG. 7 shows a flow chart to be carried out in the first recording member cutting device 20 in which, for example, when the cutting operation is started and the start switch 101 (see FIG. 6) is depressed, the laser radiating device 30 (which is called a laser for short according to cases) and cutting blade device 40 (which is called a blade for short according to cases) are moved to their home positions which are their initial positions (Step S01).

When the conveying of the continuous recording material S is started and the mark is detected by the mark detector 24, based on this detect information, the conveying direction and width direction cutting positions for the laser and blade are calculated respectively (Steps S02 to S04).

Next, based on the thus calculated cutting positions, the laser radiating device 30 carries out the following operations. That is, in order to correspond to the calculated cutting positions, the laser radiating device 30 moves to the width direction cutting position where a nick cutting operation is started, and the laser turns on and starts to cut a nick in the recording member S (Steps S11 to S13). In this case, while the time necessary for the output of the laser oscillator 31 to be stabilized is taken into consideration, the laser oscillator 31 is previously turned on.

Since the recording member S, in which a nick cutting operation has been started by the laser, is conveyed as it is, in the recording member S, a nick on a straight line along the conveying direction is formed. Next, it is checked whether the movement of the laser in the width direction is necessary or not. If found necessary, the laser is moved; and, if not, the current position of the laser is kept on (Steps S14, S15). At the then time, when the laser is moved in the width direction, in the recording member S being conveyed, a nick in a direction intersecting with the conveying direction is formed. And, it is checked whether the nick cutting operation reaches a terminating position or not. If it is found that the cutting operation has reached the end position, the laser is turned off; and, if not, the processing goes back to Step S14 (Steps S16, S17).

And, it is checked whether the recording member S to be processed is completed or not. If completed, the processing is ended; and, if not, the processing goes back to Step S11 (Step S18).

On the other hand, based on the cutting position calculated in Step S04, the cutting blade device 40 carries out the following operations. That is, a blade existing near to the cutting position is selected, and a cutting blade 41 selected is moved to the cutting position according to the movement of the support member 44 (Step S21). And, after the cutting blade 41 arrives at the cutting position, it is checked whether it is a cutting start position or not (Step S22). If it is found that it is a cutting start position, the edge of the cutting blade 41 is inserted into the upstream side portion of the nick formed by the laser. That is, when the cutting blade 41 existing at its retreat position is moved downward to its advance position by the moving device 42, the cutting operation by the edge of the cutting blade 41 is started (Step S23). And, this cutting state is kept on up to a cutting end position and, if the cutting operation is completed, the cutting blade 41 is pulled back to its retreat position (Steps S24, S25). Therefore, in the recording member S being conveyed, a cutting locus which exists on a straight line is formed. And, it is checked whether the recording member S to be processed is completed or not. If the recording member S is finished, the cutting operation is ended. And, if not, the processing goes back to Step S21 (Step S26).

Figure 8:
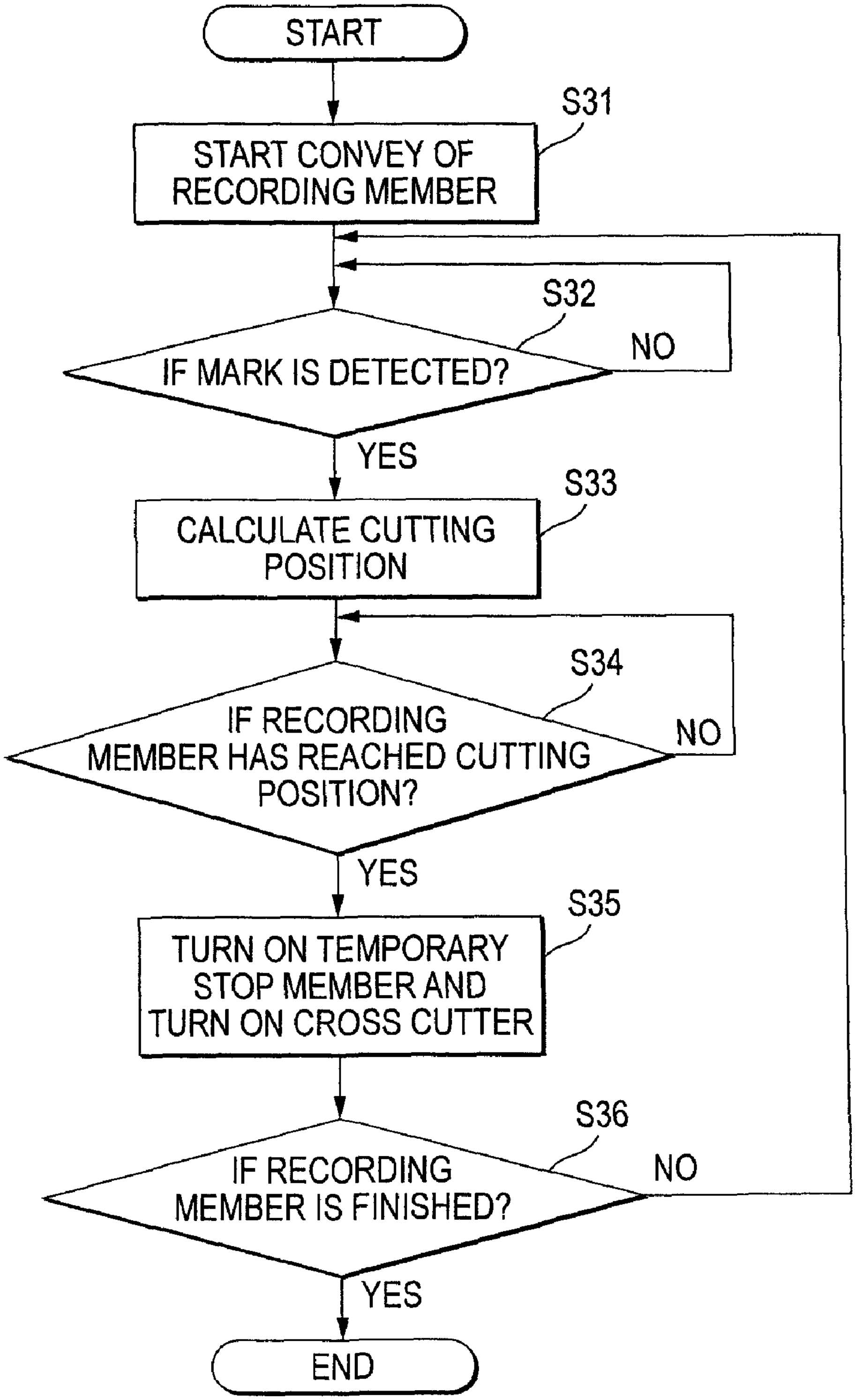
FIG. 8 is a flow chart of processing to be executed by a second recording member cutting device according to the first exemplary embodiment.

Also, FIG. 8 shows a flow chart of processings to be executed by the second recording member cutting device 60. When the conveying of the continuous recording material S is started, the two recording members S, which have been produced by dividing the recording member S into two in the first recording member cutting device 20, as they are, are cut along the width direction thereof by the second recording member cutting device 60. By the way, as regards the present flow chart, since the processings to be carried out by the two-divided recording members S are the same, only the processings to be executed by one of the two-divided recording members S are shown in the present flow chart.

Firstly, in the second recording member cutting device 60, when, with the conveying of the continuous recording material S, the mark is detected by the mark detector 63, the cutting position of the continuous recording material S in the width direction thereof is calculated according to such detect information (Steps S31 to S33). And, it is checked whether the recording member S has arrived at the cutting position or not. If it is found that the recording member S has arrived at the cutting portion, not only the recording member S is caused to stop temporarily but also the cross cutters 70 are turned on to thereby cut the recording member S in the width direction thereof (Steps S34, S35). And, it is checked whether the recording member S to be processed is completed or not. If the recording member S is finished, the cutting operation is ended; and, if not completed, the processing goes back to Step S32 (Step S36).

Figure 9A:
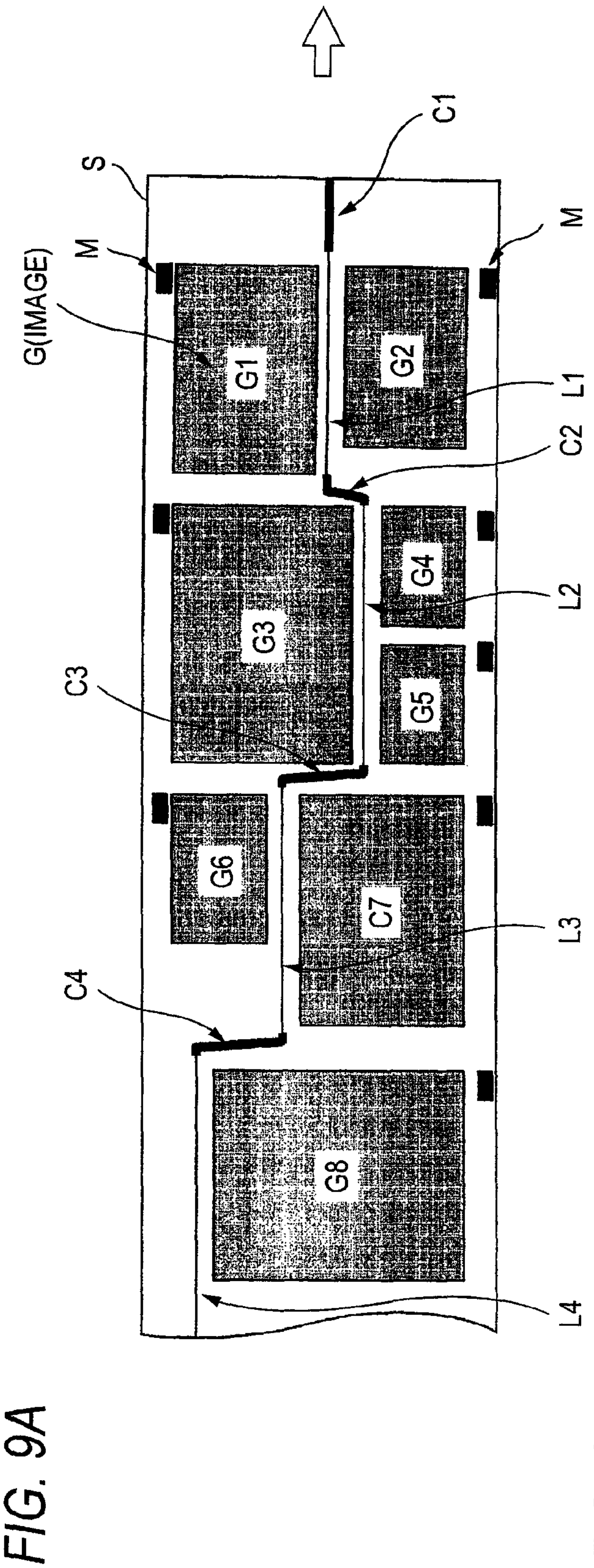
FIG. 9A is a typical view of the state of a recording member according to the first exemplary embodiment when it is cut and divided.
Figure 9B:
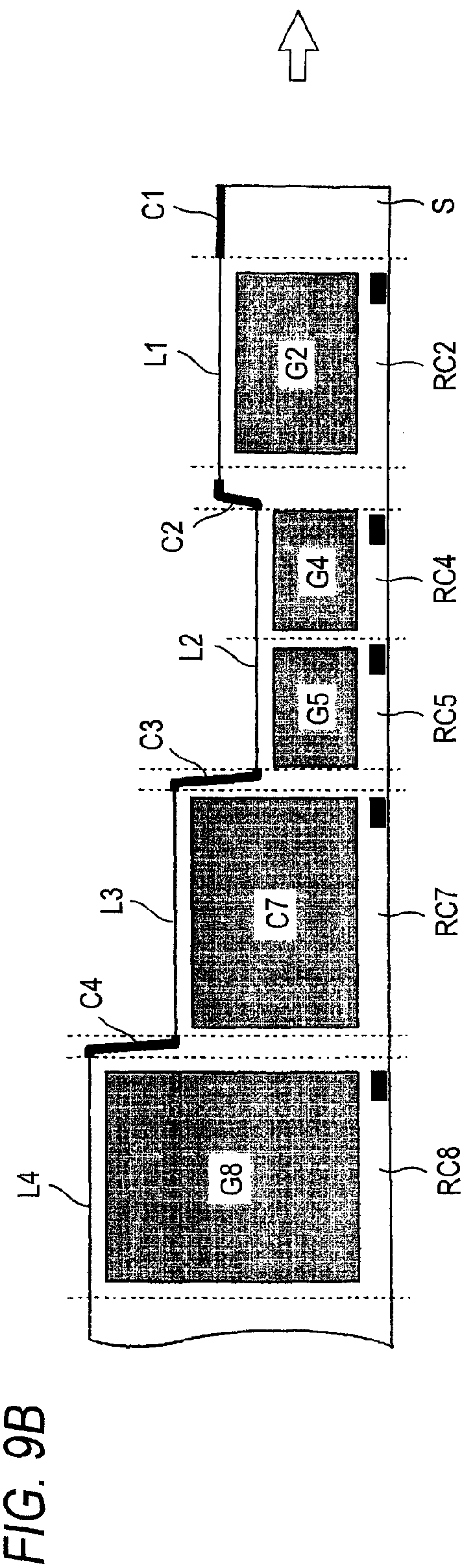
FIG. 9B is a typical view of the state of the recording member after it is cut and divided.

Next, description will be given below of a specific recording member S cutting operation to be executed in the above-mentioned recording member cutting processing apparatus with reference to typical views of the cutting states of the recording member S respectively shown in FIGS. 9A and 9B. Here, FIG. 9A shows the cutting state of the recording member S that has been cut by the first recording member cutting device 20. FIG. 9B shows the cutting state of the recording member S to be cut by the second recording member cutting device 60.

Now, as shown in FIG. 9A, suppose that images G (G1 to G8) different in size from each other have been formed on the continuous recording material S, in the first recording member cutting device 20, such recording member S is divided into two with respect to the width direction thereof which is perpendicular to the conveying direction thereof. At the then time, in the laser radiating device 30, nicks C1 to C4 are formed. And, in the cutting blade device 40, cut linear portions L1 to L4 are formed. In FIG. 9A, reference character M designates a mark which is provided in correspondence to an image.

The nick C1 existing in the head position of the recording member S is formed by the laser substantially in the middle portion (the position along the width direction) between the two images G1 and G2 along the conveying direction. Such formation of the nick C1 in the head position of the recording member S using the laser provides the following advantage: that is, a well-finished nick C can be formed easily without applying an extra load to the recording member S or without causing inconveniences such as damage in the recording member S due to mechanical impact applied thereto. However, when the nick C is formed using the laser in this manner, the width dimension of the nick C increases by an amount equivalent to the cut loss of the recording member S, thereby causing a so called cutting margin.

Next, the cutting blade (edge) 41 is inserted into the recording member S while matching it to the upstream side of this nick C1 and, as the recording member S is conveyed, the cutting blade 41 is allowed to cut the recording member S on a straight line. In this cutting portion, a cut linear portion L1 which extends parallel to the conveying direction is formed. This cut linear portion L1 does not need a cutting margin, because it is cut simply by the sharp edge of the cutting blade 41 differently from the case using the laser. Also, in the case using the laser, since the recording member S is burnt by the laser, in the cut portion, carbides are produced and thus the cut portion is easy to change in color. However, in the cut linear portion L, such phenomenon never occurs and a well-finished cut surface can be obtained. Further, the cutting edge of the cutting blade 41 can be easily inserted into a nick C having a large width. So, in the cutting starting time, no extra load can be applied to the recording member S.

And, since, in the position where the cut linear portion L1 is completed, there has been previously formed a nick C2 by the laser, the cutting loci of the cut linear portion L1 and nick C2 are alternately connected to each other to thereby provide a continuous locus, which makes it possible to cut and divide the recording member S.

In the nick C2, the laser moves in the width direction after it has started its cutting operation. So, an obliquely extending nick portion is formed in the recording member S. And, when the width direction movement of the laser is caused to stop, the final shape of the nick C2 provides a curved shape. After then, similarly, the cut linear portion L2, nick C3, cut linear portion L3, nick C4 and cut linear portion L4 provide a continuous locus. And the recording member S can be cut and divided with respect to the width direction thereof according to the image G.

Next, as shown in FIG. 9B, description will be given below of an operation to cut one of the two divisional sections of the cut and divided recording member S, in the first exemplary embodiment, the lower divisional section using the second recording member cutting device 60. The cut and divided recording member S is cut at the positions that are respectively shown by broken lines in FIG. 9A. That is, by cutting the recording member S at a total of nine positions including the two positions of the cut linear portion L1 (the start position and intermediate position thereof), the three positions of the cut linear portion L2 (the start, intermediate and end positions thereof), the two positions of the cut linear portion L3 (the start and end positions thereof), and the two positions of the cut linear portion L4 (the start and intermediate positions thereof), the recording member S can be cut in each of cutting areas RC2, RC4, RC5, RC7 and RC8 respectively corresponding to the images G2, G4, G5, G7 and G8. Therefore, in each of the finally cut recording members S, the cut portion thereof is cut over the entire periphery thereof by the cutting edge. This can improve the quality of the finished cut surface of the cut portion and, for example, when compared with the cut surface that has been cut only by the laser, the present cut surface can be greatly free from ill influences caused by change in color or by contamination.

According to the first exemplary embodiment, there is shown a method of forming an obliquely extending nick using the laser radiating device 30. However, for example, even when the images G formed on the continuous recording material S are lined up, the recording member can be cut using the present recording member cutting processing apparatus. In this case, a nick C to be formed using the laser may have a shape which exists on a straight line along the conveying direction. And, the cutting of the recording member S using the cutting edge may be started at and from the position of this nick C. Also, according to the first exemplary embodiment, a structure for simply moving the cutting blade 41 between the retreat and advance positions is shown. However, it is also possible to employ, for example, a structure in which the cutting blade 41 at the advance position, that is, the cutting blade 41 held in its cutting state can also be further vibrated slightly in the vertical direction. In this case, a load to be applied to the recording member S while it is being cut can also be reduced.

Further, according to the first exemplary embodiment, the mark detector 24 of the first recording member cutting device 20 and the mark detector 63 of the second recording member cutting device 60 may also be disposed downwardly of the recording member convey passage. In this case, the mark forming surface of the roll-shaped recording member 10 wound in a roll-like manner may be matched to these mark detectors. Also, the two mark detectors may also be disposed above and below the recording member convey passage respectively.

According to the first exemplary embodiment, as shown in FIG. 9B, there is shown a mechanism in which, when the two-divided recording member S is cut into individual cut recording members using the second recording member cutting device 60, the marks M are left at the side of the images G respectively. Alternatively, however, when the marks M are formed at positions that are substantially lined up with respect to the conveying direction, as a cutting mechanism that continuously cuts the near-to-side-edge portions of the recording member S where the marks M are formed, there may also be employed an area cutting mechanism. That is, on the near-to-side-edge portions, the sides to be cut of the recording member S along the conveying direction are lined up on a straight line, thereby being able to continuously cut such sides of the recording member S along the conveying direction.

Figure 10:
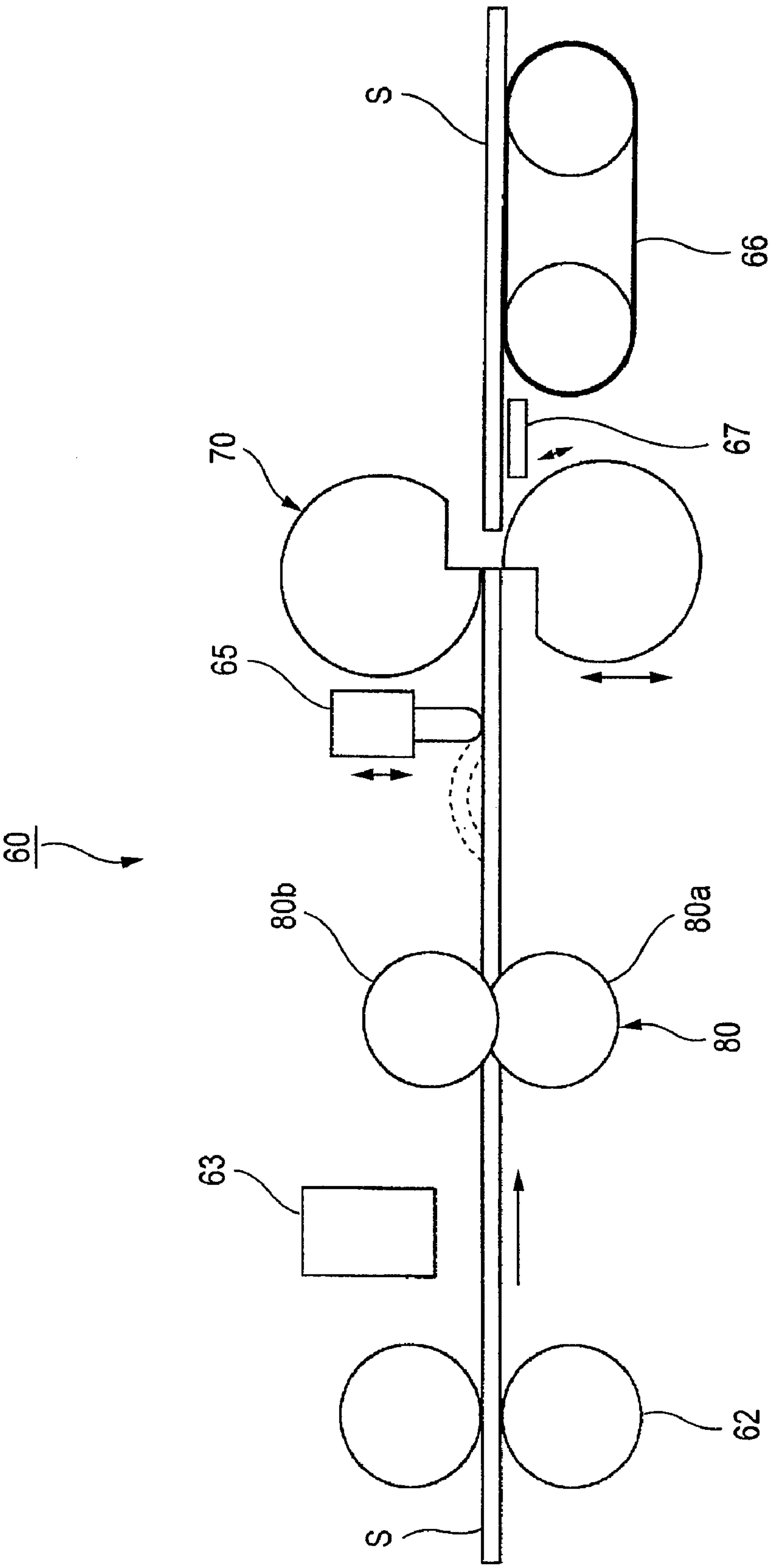
FIG. 10 is an explanatory view of a modification of the second recording member cutting device according to the first exemplary embodiment.

Now, FIG. 10 shows an example of the above structure in which the second recording member cutting device 60 includes another area cutting mechanism separately from the area cutting mechanism of the first recording member cutting device 20 functioning as an element of the first recording member cutting device 20. For example, a slitter 80 is used to continuously cut the near-to-side-edge portions of the recording member S along the conveying direction. Accordingly, since the mark M portions of the recording member S are cut out along the conveying direction, it is possible to construct a recording member cutting processing apparatus which can provide a further better finished cut surface.

The slitter 80 according to the first exemplary embodiment has a paired structure which is composed of a lower blade 80*a* to be disposed on the lower side of the paired structure and an upper blade 80*b* disposed to be disposed on the upper side of the paired structure. These two blades mesh with each other in the cutting area while they are overlapped in part with each other. And, the edge surfaces of these two blades face each other. Thus, the overlapping portion can be used to cut (slit) the recording member S. That is, since the side edge portions of the recording member S, where the marks M are formed, can be cut and separated from the recording member S, the recording members S, which have been cut to individual recording members, can be finished in an excellent cut state with the marks M removed therefrom. Here, the cut trash, which is produced when the recording member S is cut using the slitter 80, can be collected on an upstream of the cross cutters 70 by a collecting mechanism (not shown).

Figure 11A:
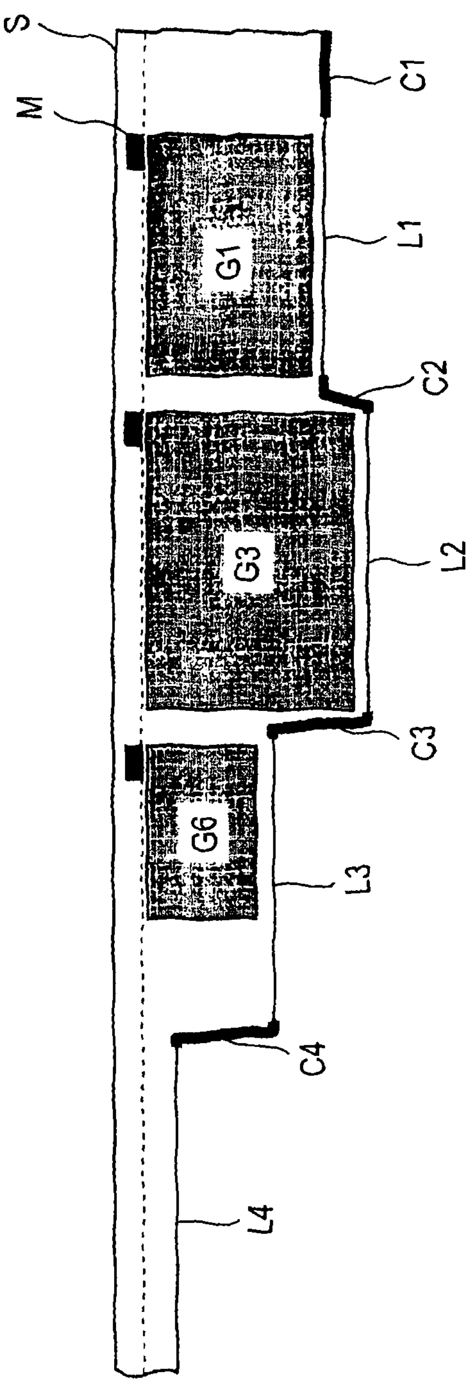
FIG. 11A is a typical view of the state of the cut and divided recording member before it is continuously cut by a slitter.
Figure 11B:
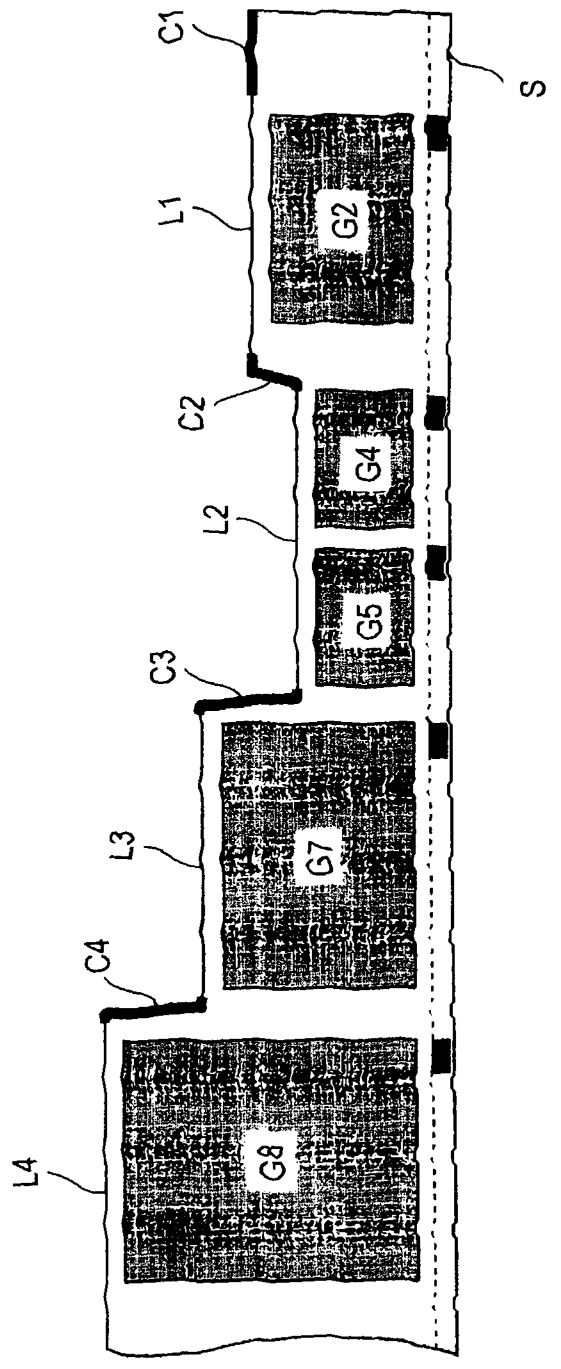
FIG. 11B is a typical view of the state of the cut and divided recording member before it is continuously cut by a slitter.

FIGS. 11A and 11B are respectively typical views of the states of the recording member S when the cut recording member S is cut by the slitter 80. Like this, suppose that the marks M provided on the cut and divided recording members S are lined up along the conveying direction, when removing the marks M from the recording members S to be cut finally to individual recording members, the near-to-side-edge portions of the cut recording members S may be cut continuously along the conveying direction using the slitter 80, thereby being able to cut the portions of the respective divided recording members S shown by broken lines in FIG. 11. This can remove the marks M easily from each individual recording member S, which makes it possible to provide well-finished recording members S.

According to the first exemplary embodiment, there is shown a structure in which the slitter 80 is provided in a portion of the second recording member cutting device 60. This structure is employed in order to operate the second recording member cutting device 60 based on the mark M detect information provided by the mark detector 63. For example, when the cutting information to be used in the second recording member cutting device 60 can be obtained from the mark detector 24 (see FIG. 3) of the first recording member cutting device 20, the slitter 80 can also be disposed on an upstream side of the second recording member cutting device 60 in the conveying direction. By the way, although the structure using the slitter 80 is shown here, alternatively, for example, there may also be employed a structure in which, after the cutting blade 41 is inserted into the recording member S in the non-cutting area thereof, while holding this state as it is, the recording members S are continuously cut in the conveying direction by a force used to convey the recording members S. Or, a nick C may be formed using the laser, the cutting blade 41 may be inserted into the nick C, and, while holding this state as it is, the recording members S may be cut continuously along the conveying direction.

Figure 12A:
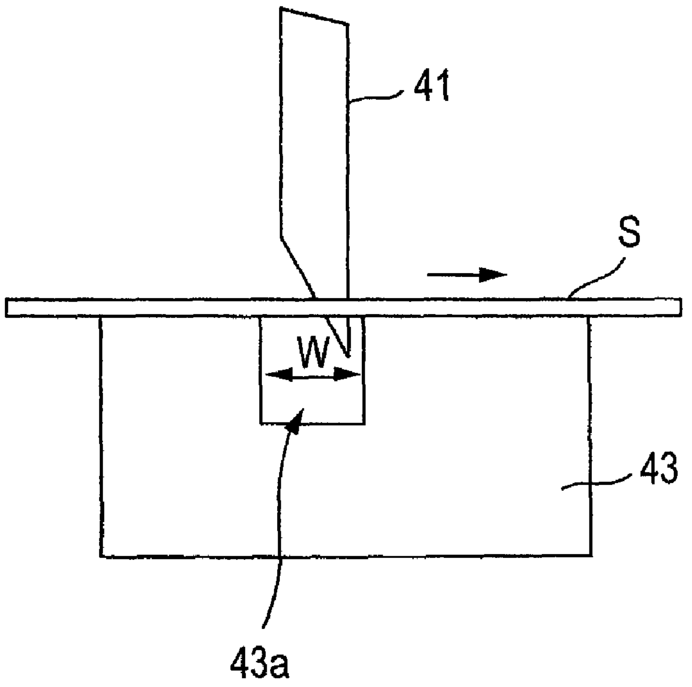
FIG. 12A is an explanatory view of a cutting table according to the first exemplary embodiment.
Figure 12B:
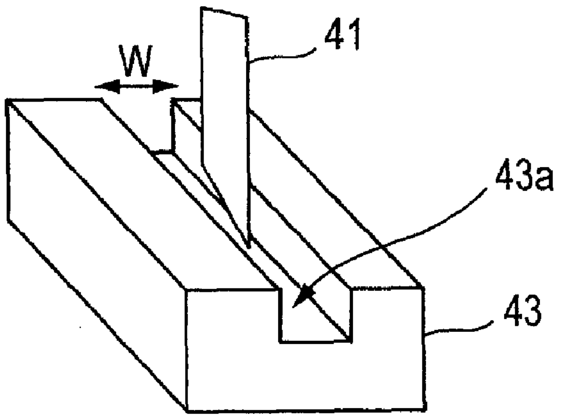
FIG. 12B is an explanatory view of the cutting table according to the first exemplary embodiment.

Next, description will be given below of a modification of the cutting table 43. The cutting table 43 according to the first exemplary embodiment is structured such that, as shown in FIGS. 12A and 12B, in the portion thereof where the cutting edge of the cutting blade 41 is to be inserted downwardly of the recording member S, a recessed portion 43*a* which extends in the width direction is formed, thereby allowing the cutting blade 41 existing at the advance position to operate freely. Here, there is shown only one cutting blade 41 as a representative.

In this manner, according to the first exemplary embodiment, over the entire width direction portion of the recording member S, there exists an area which extends by a length w in the conveying direction and is incapable of supporting the recording member S from the lower surface thereof. This can raise a problem that the recording member S can be deformed downward unnecessarily when it is cut by the cutting blade 41.

Figure 13A:
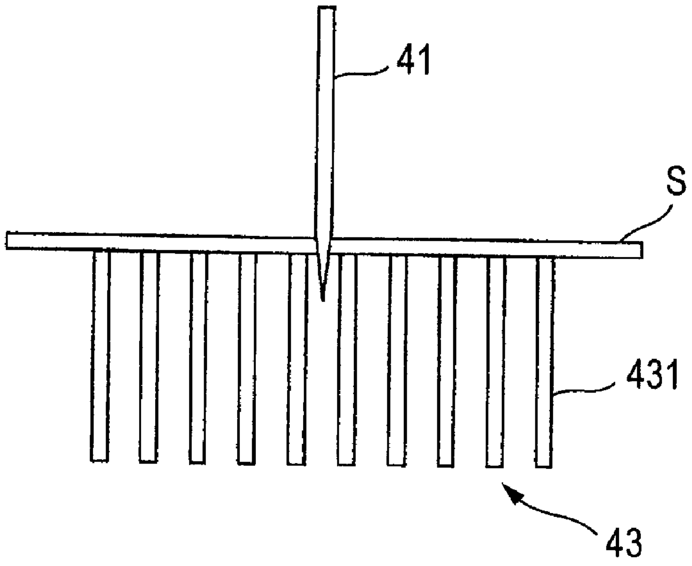
FIG. 13A is an explanatory view of a modification of the cutting table.
Figure 13B:
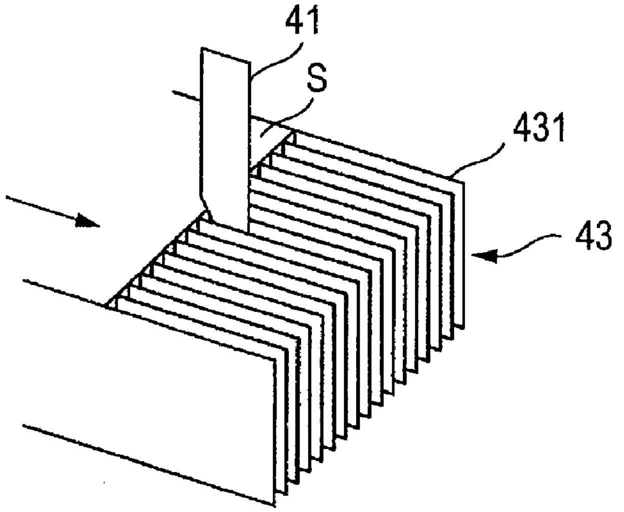
FIG. 13B is an explanatory view of the modification of the cutting table.

In order to solve this problem, as shown in FIGS. 13A and 13B, the cutting table 43 may be structured such that it includes, for example, plural plate-shaped members 431 each having a rectangular section arranged substantially at regular intervals along the conveying direction to thereby be able support the recording member S in the conveying direction even when the recording member S is cut using the cutting blade 41. This structure can prevent the deformation of the recording member S and thus can provide a further better cut-finished recording member S. In this case, the spacing between the plate-shaped members 431 is set similar to the spacing between the cutting blades 41 or is set one integer (1/an integer) and, when the cutting blade 41 is moved in the width direction, the cutting table 43 is also moved similarly. Owing to this, even when any one of the plural cutting blades 41 is selected, there exist no obstacles to the cutting operation to be executed by the cutting blade 41. Here, the shape of the plate-shaped member 431 is not limited to the shown shape but there can be used any shape, provided that it can support the recording member S.

Figure 14A:
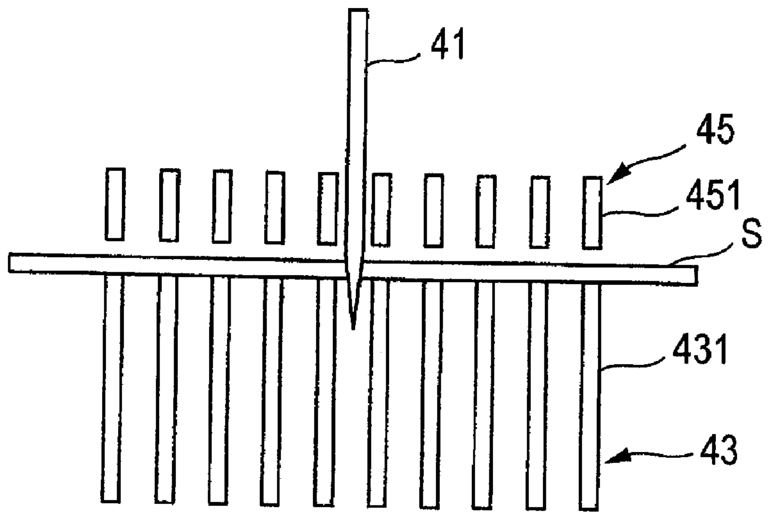
FIG. 14A is an explanatory view of another modification of the cutting table further including a stop member.
Figure 14B:
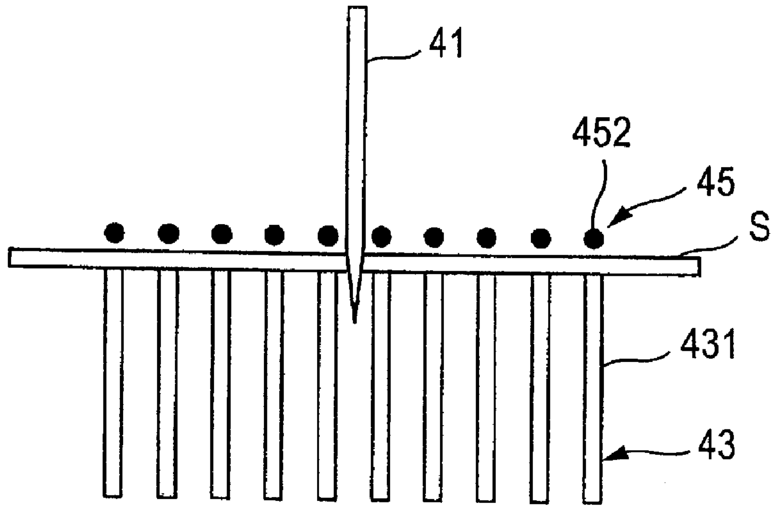
FIG. 14B is an explanatory view of the above modification of the cutting table further including the stop member.

And, in using such cutting table 43, in the vicinity of the upper surface of the recording member S, a stop member 45 is further provided. The stop member can stop the movement of the recording member S in its floating-up direction caused by the advancing and retreating movements of the cutting blade 41, the cut finishing of the recording member S by the cutting blade 41 can be improved further better. FIGS. 14A and 14B respectively show examples of the stop member 45. Specifically, in FIG. 14A, plural stop members 451 each having a substantially rectangular section are arranged at similar intervals to the plate-shaped members 431 of the cutting table 43. Also, in FIG. 14B, plural linear members 452 each having a substantially circular section are arranged. And, when these stop members 45 are arranged in the vicinity of the recording member convey passage, there can be provided an effect that, without providing obstacles to the convey of the recording member S, the floating-up movement of the recording member S can be controlled when it occurs. Also, these stop members 45 are structured such that they allow the cutting blade 41 to advance and retreat (operate in the vertical direction) through their spacing and thus to move in the width direction integrally with the cutting table 43.

Figure 15A:
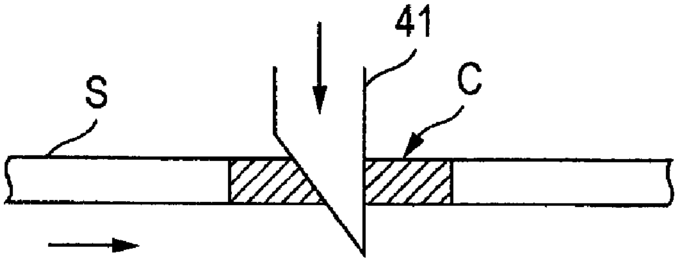
FIG. 15A is an explanatory view of the operation of a cutting blade according to the first exemplary embodiment.
Figure 15B:
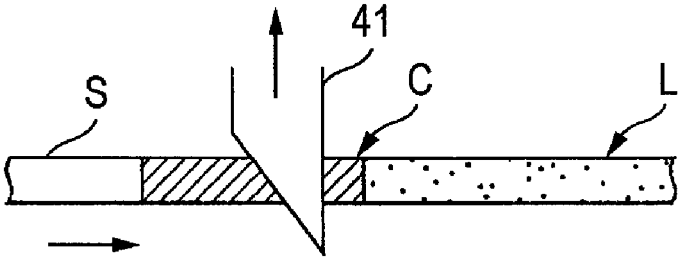
FIG. 15B is an explanatory view of the operation of the cutting blade according to the first exemplary embodiment.

Next, description will be given below of a modification of a cutting method to be enforced by the cutting blade 41. According to the first exemplary embodiment, there is shown a structure in which, as shown in FIG. 15A, in the position of one nick C, the cutting blade 41 is inserted into its advance position and, as shown in FIG. 15B, in the position of a next nick C, the cutting blade 41 is pulled out and moved into its retreat position. In this structure, in the nick C, use of the laser makes it easy to carbonize the recording member S. Owing to this, the thus carbonized and contaminated portion of the recording member S sticks to the cutting blade 41. While holding the cutting blade 41 in such a contaminated state, the cut linear portion L is formed using the cutting blade 41 and, after then, when the cutting blade 41 arrives at the next nick C, it is pulled out and moved into the retreat position. As a result of this, there is a possibility that the contamination stuck to the cutting blade 41 in the nick C can continue to stick to the cut linear portion L cut by the cutting blade 41, thereby raising a fear that the cut finished state of the cut linear portion L can be degraded.

Figure 16A:
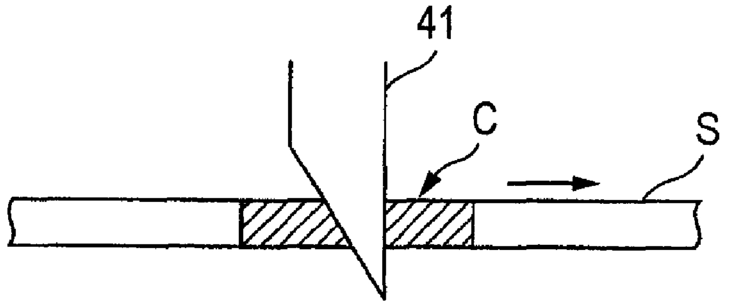
FIG. 16A, FIG. 16B and FIG. 16C are respectively explanatory views of a modification of the operation of the cutting blade.
Figure 16B:
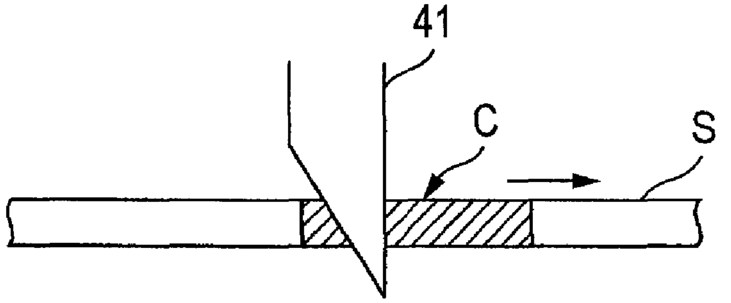
Figure 16C:
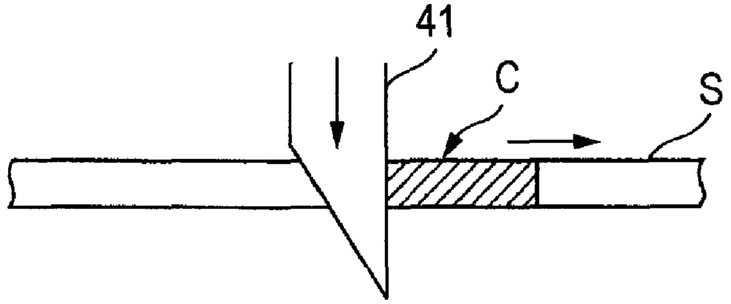

In view of the above, the edge of the cutting blade 41 once inserted into the nick C may be moved further. This can wipe away the contamination that has stuck to the edge of the cutting blade 41 in the nick C and thus can eliminate the need to worry about the fear of the contamination sticking to the next cut linear portion L. FIG. 16 shows an example of such modification. Specifically, the cutting blade 41 is inserted into the nick C as shown in FIG. 16A and, when the cutting blade 41 arrives at the vicinity of the downstream end of the nick C as shown in FIG. 16B, it is further pushed in to thereby move the cutting blade 41 as shown in FIG. 16C. According to this method, even when the cutting blade 41 is contaminated in the nick C, the surface of the cutting edge thereof can be wiped, thereby being able to eliminate the need to worry about the contamination of the cutting blade 41 when it is used to cut and form a next cut linear portion L.

Figure 17A:
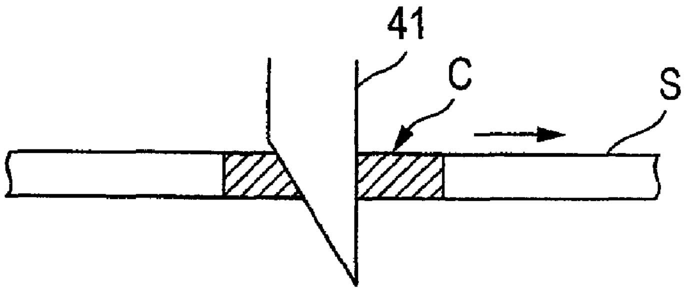
FIG. 17A, FIG. 17B and FIG. 17C are respectively explanatory views of another modification of the operation of the cutting blade.
Figure 17B:
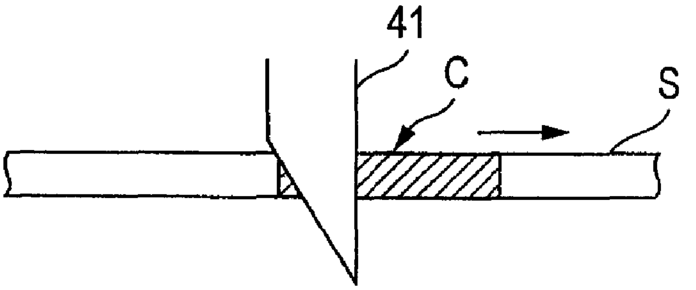
Figure 17C:
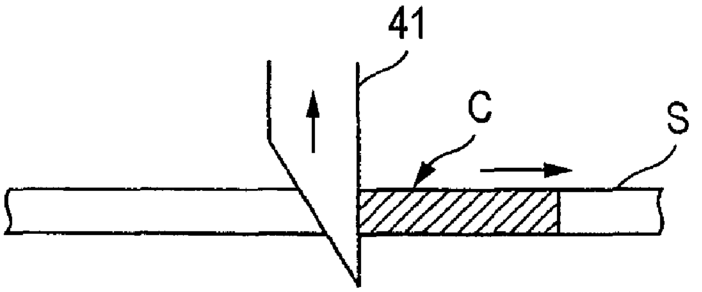

Also, as another modification, there can be provided a method shown in FIG. 17. That is, the cutting blade 41 is inserted into the nick C as shown in FIG. 17A and, when the cutting blade 41 arrives at the vicinity of the downstream end of the nick C as shown in FIG. 17B, it is pulled up slightly to thereby hold it as shown in FIG. 17C. According to this method, even when the cutting blade 41 is contaminated in the nick C, the surface of the cutting edge thereof can be wiped, thereby being able to eliminate the need to worry about the contamination of the cutting blade 41 when it is used to cut and form a next cut linear portion L.

As described above, by controlling the vertical movement of the cutting blade 41 more finely, a further better finished cut surface can be realized.

Figure 18:
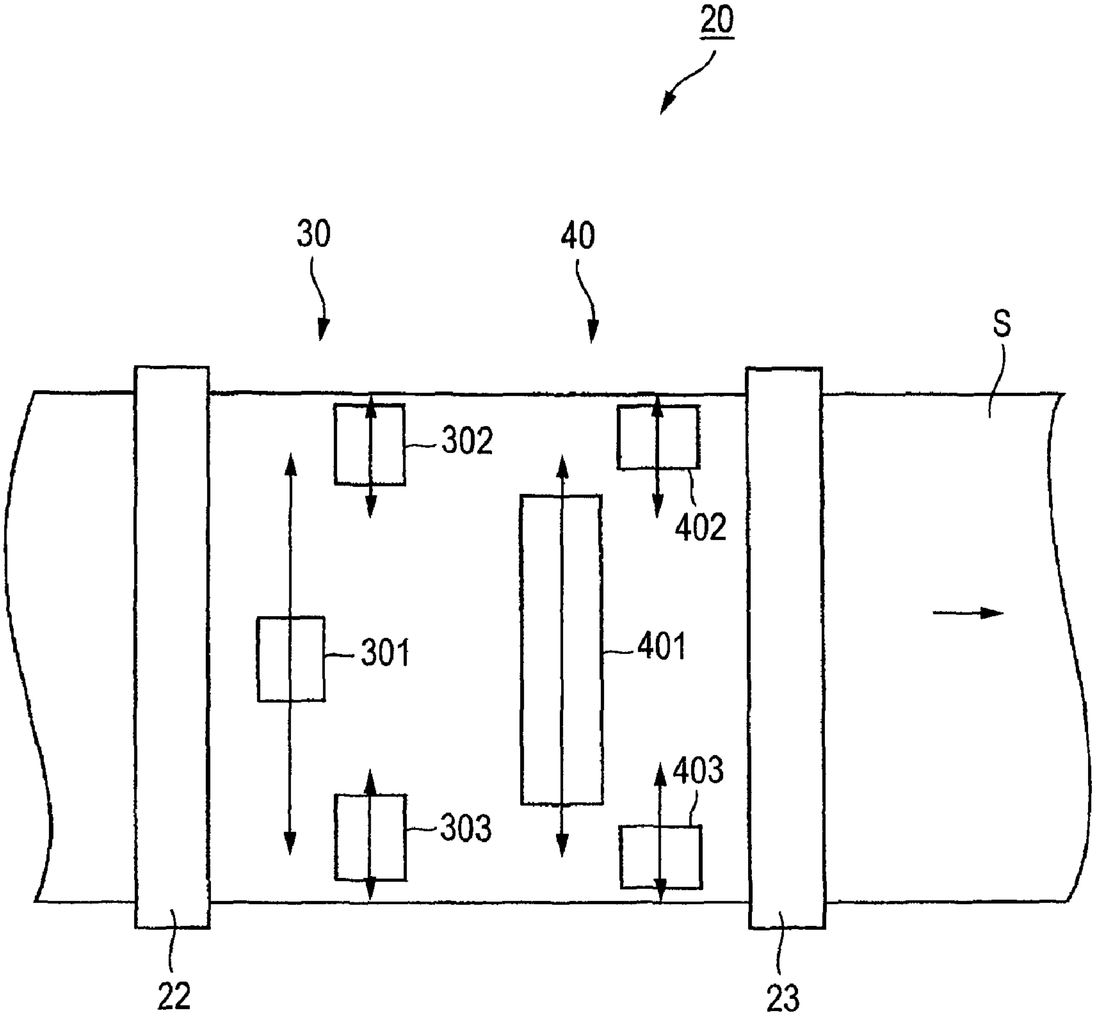
FIG. 18 is an explanatory view of a first recording member cutting device according to an exemplary embodiment 2.

Now, FIG. 18 shows a first recording member cutting device 20 included in a recording member cutting processing apparatus according to a second exemplary embodiment of the invention structured substantially similarly to the recording member cutting processing apparatus according to the first exemplary embodiment, when it is viewed from above. Here, the recording member cutting processing apparatus according to the second exemplary embodiment is substantially similar to the recording member cutting processing apparatus according to the first exemplary embodiment except for the first recording member cutting device 20. Thus, the detailed description of the second exemplary embodiment is omitted here. In FIG. 18, the first recording member cutting device 20 according to the second exemplary embodiment 2 includes plural (in the exemplary embodiment 2, three) laser radiating device 30 (specifically, 301 to 303) interposed between convey rollers 20 and 23, and plural (in the second exemplary embodiment, three) cutting blade devices 40 (specifically, 401 to 403).

Each of the laser radiating devices 30 according to the second exemplary embodiment 2 includes a center laser radiating device 301 movable in a wide range except for the two width direction side edge portions of the continuous recording material S, and two side laser radiating devices 302, 303 respectively disposed in the two width direction side edge portions of the continuous recording material S and movable in the width direction in the vicinity of the side edge portions. And, in order to prevent these laser radiating devices 30 (specifically, 301 to 303) from interfering with each other, for example, from colliding with each other even when they are respectively moved in the width direction, for example, they are disposed shifted from each other in the conveying direction of the recording member S.

Each of cutting blade devices 40, similarly to the laser radiating devices 30, includes a center cutting blade device 401, and two side cutting blade devices 402, 403 respectively disposed in the above-mentioned side edge portions. And, in order to prevent these cutting blade devices 401~403 from interfering with each other, for example, from colliding with each other even when they are respectively moved in the width direction, for example, they are disposed shifted from each other in the conveying direction of the recording member S.

The thus structured first recording member cutting device 20 may be operated substantially similarly to the first exemplary embodiment. However, since the nicks C and cut linear portions L respectively cut formed by the laser radiating devices 302, 303 and cutting blade devices 402, 403 respectively disposed in the two side edge portions are not required to provide a continuous locus in which they are connected to each other alternately, the nicks C formed by the laser radiating devices 302, 303 in the two side edge portions may be those which are formed on a straight line. That is, when the laser radiating devices 302 and 303 are moved in the width direction, their laser radiating functions may be off.

Figure 19A:
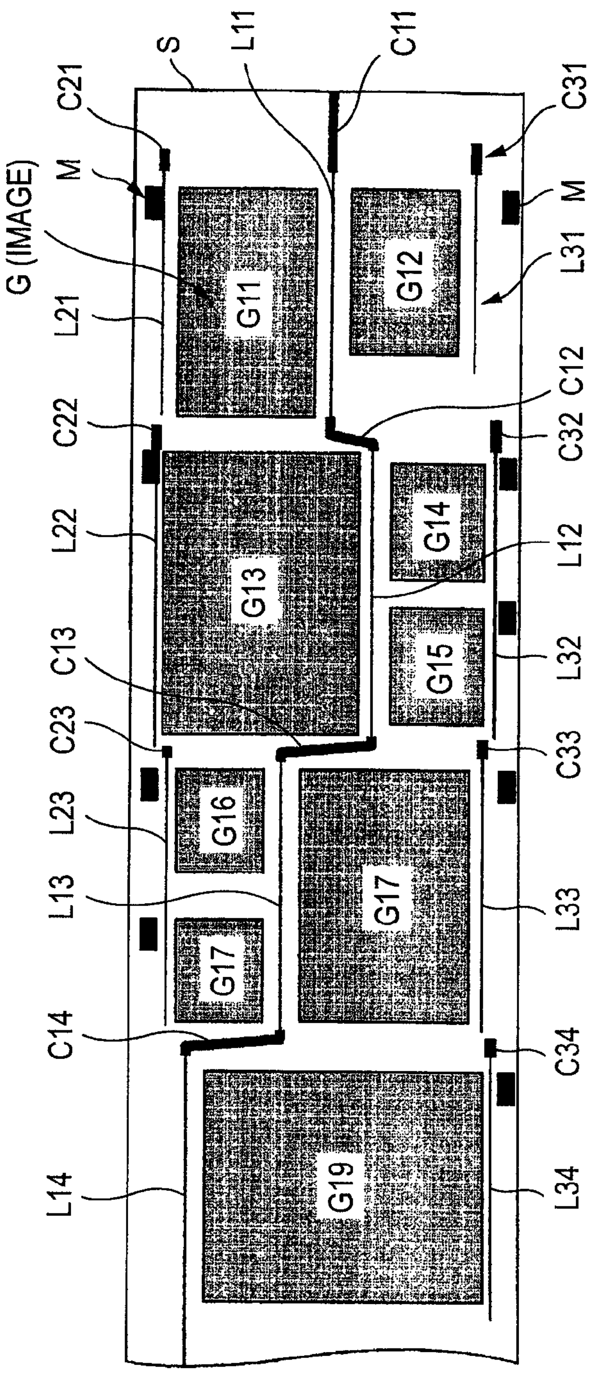
FIG. 19A is a typical view of the state of a recording member according to the exemplary embodiment 2 when it is cut and divided.
Figure 19B:
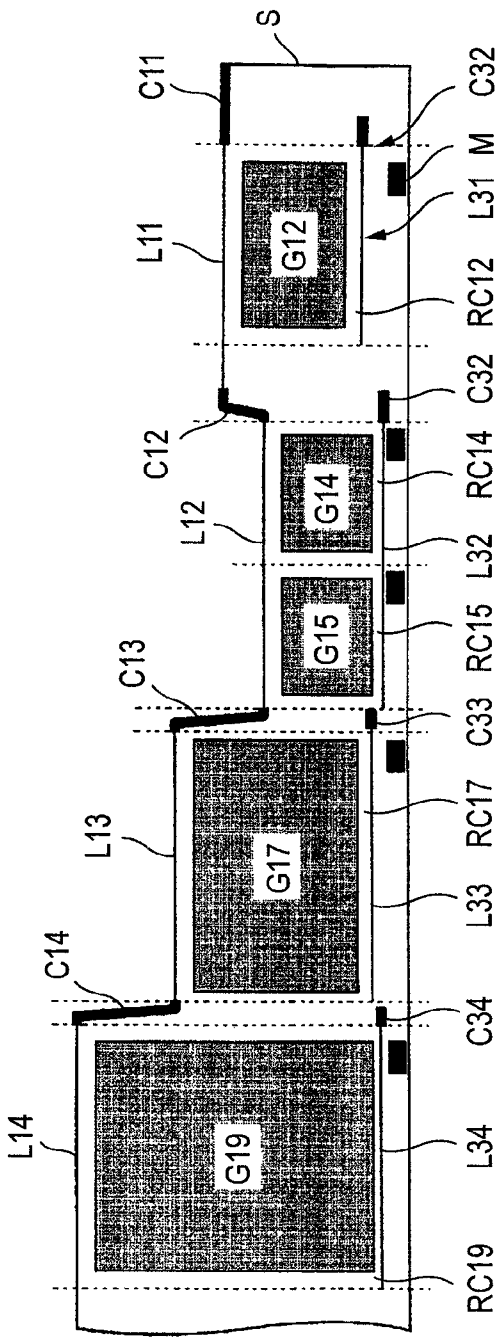
FIG. 19B is a typical view of the state of the recording member after it is cut and divided.

FIG. 19 shows the states of the continuous recording material S which has been cut and divided using the above-structured first recording member cutting device 20. Here, FIG. 19A is a typical view of the cut state of the recording member S after it has passed through the first recording member cutting device 20, and FIG. 19B shows the state of one of the recording members S (which corresponds to the lower half section of the recording member S shown in FIG. 19A) after the continuous recording material S is cut and divided to two. In the illustrated embodiment, as images G, there are arranged images G11 to G19.

Here, cut loci, which are formed by the laser radiating device 301 and cutting blade device 401 respectively disposed in the central portion of the recording member S, are connected to each other alternately, while they range in the order of a nick C11, a cut linear portion L11, a nick C12, a cut linear portion L12, a nick C13, a cut linear portion L13, a nick C14, and a cut linear portion L14.

On the other hand, as regards cut loci which are formed by the laser radiating device 302 and cutting blade device 402 respectively disposed in one side edge portion of the recording member S, a cut linear portion L21 extending from a nick C21 on a straight line, a cut linear portion L22 extending from a nick C22, and a cut linear portion L23 extending from a nick C23 are formed in such a manner that they are cut and divided from each other. Also, as regards cut loci which are formed by the laser radiating device 303 and cutting blade device 403 respectively disposed in the other side edge portion of the recording member S, a cut linear portion L31 extending from a nick C31 on a straight line, a cut linear portion L32 extending from a nick C32, and a cut linear portion L33 extending from a nick C33 are formed in such a manner that they are cut and divided from each other. Here, the cut loci respectively formed in these side edge portions are formed inwardly of the marks M.

Thus, after having passed through the first recording member cutting device 20, the recording member S has only been cut and divided into two and the cut loci of the side edge portions thereof have been divided properly. That is, in this stage, the recording member S has not been cut into separate recording members. When such recording member S is cut using the second recording member cutting device 60 (see FIG. 3), it can be cut in the portions thereof respectively shown by broken lines in FIG. 19B. In the recording member S the side of which existing along the width direction has been cut, all of the outer peripheries of the cutting areas RC (RC12, RC14, RC15, RC17 and RC19) provide the cut surfaces that have been cut using the cutting edge of the cutting blade. So there can be obtained well-finished cut surfaces. Further, since the marks M can be removed, for example, the recording member S can be easily edged so as to be suitable for the size of the image G. When cutting the recording member S in the width direction, the end portions of the side edge portions of the recording member S that are present nearer to the width direction ends of the recording member S than the cut linear portions L formed in the two side edge portions of the recording member S by the first recording member cutting device 20, are to be removed before the recording member S arrives at the recording member storage portion 68 (see FIG. 3).

Figure 20:
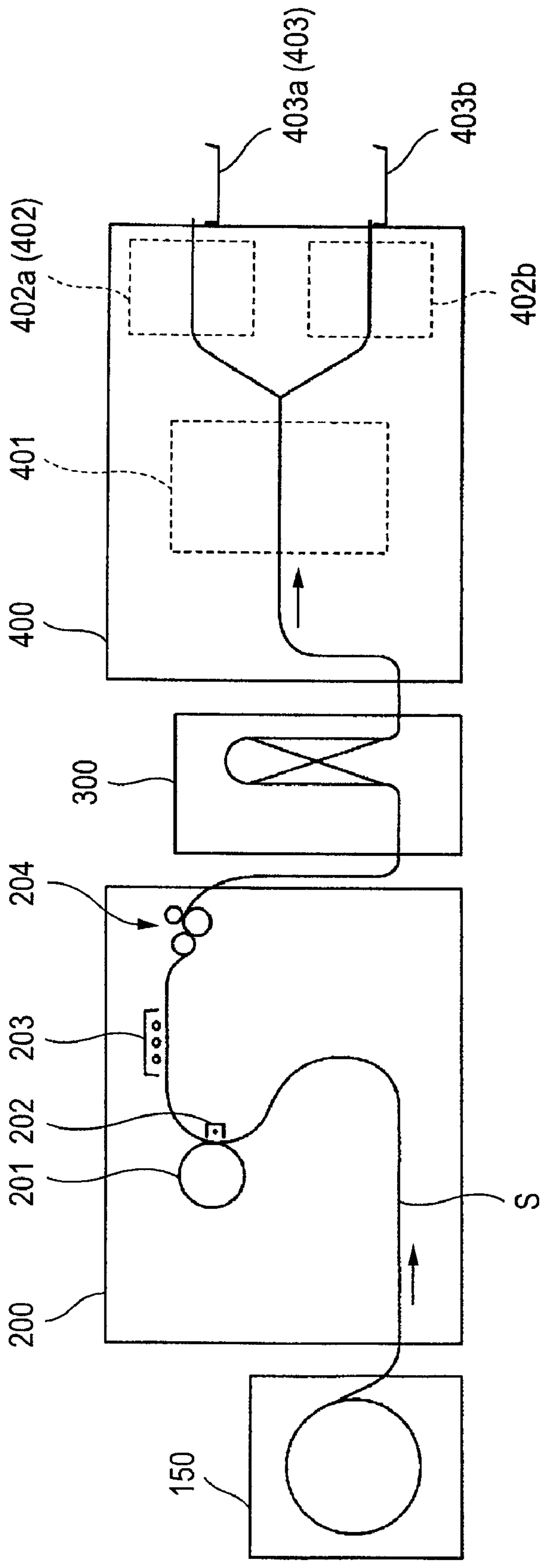
FIG. 20 is an explanatory view of a recording member cutting processing apparatus according to an embodiment 3 of the invention.

FIG. 20 is a typical view of a recording member cutting processing apparatus according to an third exemplary embodiment, which is composed of the recording member cutting processing apparatus according to the first exemplary embodiment and an image forming portion added thereto. And, recording member cutting processing apparatus according to the third embodiment is structured such that it forms an image on a roll-shaped continuous recording material S with an image not formed thereon and, after then, the continuous recording material S with the image formed thereon, as it is, can be cut in the cutting areas thereof according to their respective cutting sizes.

In FIG. 20, the recording member cutting processing apparatus according to the third exemplary embodiment includes a supply unit 150 disposed most upstream in the conveying direction for supplying the recording member S, an image forming unit 200 for forming an image on the recording member S supplied from the supply unit 150, a recording member cutting unit 400 disposed most downstream in the conveying direction for cutting and dividing the recording member S and thereafter cutting the cut and divided recording member S in the width direction thereof, and a buffer unit 300 interposed between the image forming unit 200 and recording member cutting unit 400 for controlling the conveying speed of the recording member S. By the way, in FIG. 20, for easy understanding, there is shown the recording member transfer passage, while other parts are omitted properly.

The image forming unit 200 includes a sensitive member 201 for forming a toner image and holding the same, a transfer device 202 for transferring the toner image formed and held on the sensitive member 201 onto the recording member S, a so called flush fixing device 203 for fixing the toner image transferred onto the recording member S using a lamp light source or the like, convey roller members 204 which are respectively used not only to convey the recording member within the image forming unit 200 but also to convey the fixed recording member S to a device disposed on the downstream side, and the like.

Also, the recording member cutting unit 400 is structured substantially similarly to the recording member cutting processing apparatus according to the first exemplary embodiment (see FIG. 3); and, it includes a first recording member cutting device 401 and two second recording member cutting devices 402 (402*a*, 402*b*). Also, the finally cut individual recording members S are stored into recording member storage portions 403 (403*a*, 403*b*) which are mounted on the outside of the recording member cutting unit 400.

The processing process to be carried out by the thus structured recording member cutting processing apparatus is as follows.

For example, when print information is input from an input processing device (not shown) into the image forming unit 200, an image forming processing to be executed in the image forming unit 200 is started. At the then time, as an image to be formed on the recording member S, an image having cutting areas respectively different in cutting sizes is formed and, at the same time, a mark containing cutting information corresponding to the image is formed. And, when such image is formed on the sensitive member 201, an image, which has been fixed after it was transferred onto the recording member S, provides, for example, such an image as shown in FIG. 9A.

And, the recording member S, the conveying speed of which has been controlled by the buffer unit 300, is conveyed to the recording member cutting unit 400, where it is cut and divided to two and is then cut in the width direction thereof; and, recording members S, which respectively have given sheet sizes corresponding to the cutting areas to be cut, are stored into the recording member storage portions 403.

Also, in the image forming unit 200 of the above-structured recording member cutting processing apparatus, in the recording member S, excepting image non-forming areas which respectively extend over the entire areas of the recording member S in the width direction thereof perpendicular to the conveying direction thereof, the areas of the recording member S intervening between the mutually adjoining image non-forming areas along the conveying direction may be used as image forming areas. Owing to this, for example, as shown in FIG. 9A, portions not to be cut along the conveying direction intervening between the images can be set in and from the image forming stage. This can facilitate the cutting operation to be executed thereafter.

According to the third exemplary embodiment, as the image forming system, there is shown an electro photographic system. However, this is not limitative but, for example, there may also be used an ink jet system.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording member cutting device for cutting a continuous recording material along a side of a plurality of cutting areas defined in the continuous recording material comprising:

an nick cutting mechanism that includes a first cutting unit configured to move in a direction intersecting with a conveying direction of the continuous recording material and configured to form a nick for each cutting area, each nick being located (i) outside the plurality of the cutting areas, (ii) on a downstream side of the corresponding cutting area in the conveying direction and (iii) on a line extending along one side of the corresponding cutting area, the one side being along the conveying direction; and, an area cutting mechanism that includes a second cutting unit configured to move in a direction intersecting with the conveying direction and configured to insert into the nick, the second cutting unit that cuts the continuous recording material along the one side of cutting area, and the second cutting unit cuts, when the nick is formed, the continuous recording material along the one side from a position of the nick.

2. The recording member cutting device according to claim 1, wherein the cutting locus of the range of each nick formed by the first cutting mechanism and the cutting locus of the range of each area cut and formed on a straight line by the second cutting mechanism are alternately connected to each other by the first cutting mechanism to provide a continuous locus.

3. The recording member cutting device according to claim 1, wherein the first cutting unit forms the nick using a laser disposed spaced from the continuous recording material being conveyed.

4. The recording member cutting device according to claim 1, wherein the second cutting unit includes a cutting blade configured to move between a retreat position spaced from the continuous recording material being conveyed, and an advance position for cutting the continuous recording material while straddling the continuous recording material.

5. The recording member cutting device according to claim 4, wherein the area cutting mechanism includes an opposed member that is in contact with a surface of the continuous recording material, the opposed member is disposed on the opposite side of the cutting blade held in the retreated state with respect to the continuous recording material, and the opposed member extends in a direction intersecting with the conveying direction.

6. A recording member cutting device according to 4, wherein the area cutting mechanism includes a stop member disposed in the vicinity of the continuous recording material being conveyed, and the stop member prevents the continuous recording material from floating up due to the advancing and retreating movements of the cutting blade.

7. The recording member cutting device according to claim 1, wherein, a first side of the cutting area and a second side of another cutting area are arranged to line up on a straight line along the conveying direction, and the area cutting mechanism is configured to continuously cut a first part of the continuous recording material along the first side and a second part of the continuous recording material along the second side without the nick therebetween.

8. A recording member cutting processing apparatus for cutting a continuous recording material being conveyed along a side of a plurality of cutting areas defined in the continuous recording material, comprising:

a first cutting device that cuts the continuous recording material along a first side of each cutting area, each first side being along a conveying direction of the continuous recording material;

a second cutting device that is disposed on a downstream side of the first cutting device in the conveying direction, the second cutting device that cuts the continuous recording material cut by the first cutting device along a second side of each cutting area, the second side which intersects with the first side of each cutting area; and wherein the first cutting device includes:

a first cutting mechanism that includes a first cutting unit configured to move in a direction intersecting with the conveying direction of the continuous recording material and configured to form a nick for each cutting area, each nick being located (i) outside the plurality of the cutting areas, (ii) on a downstream side of the corresponding cutting area in the conveying direction and (iii) on a line extending along the first side of the corresponding cutting area; and, an area cutting mechanism that includes a second cutting unit configured to move in a direction intersecting with the conveying direction and configured to insert into the nick, the second cutting unit that cuts the continuous recording material along the first side of each cutting area, the second cutting unit that cuts, when the nick is formed, the continuous recording material along the first side from a position of each nick.

9. The recording member cutting processing apparatus according to claim 8, wherein the cutting locus of the range of the nick cut and formed by the nick cutting mechanism and the cutting locus of the range the area cut and formed on a straight line by the area cutting mechanism are alternately connected to each other to provide a continuous locus, the second cutting device includes a plurality of intersecting cutting mechanisms, the plurality of intersecting cutting mechanisms are provided respectively for each divided continuous recording material which is cut and divided by the first cutting mechanism along the continuous locus, the intersecting cutting mechanism is configured to cut and divide each divided continuous recording material in a direction intersecting with the conveying direction.

10. The recording member cutting processing apparatus according to claim 8 further comprising:

a mark detector that detects a mark given to each cutting area, wherein the first cutting device performs a first cutting operation based on mark detection information acquired by detecting the mark, and the second cutting device performs a second cutting operation based on mark detection information acquired by detecting the mark.

11. The recording member cutting processing apparatus according to claim 8, wherein the first cutting device includes a plurality of the nick cutting mechanisms and the area cutting mechanisms in a direction intersecting the conveying direction of the continuous recording material, a cutting locus of a range of each nick cut by the nick cutting mechanism disposed near to side edge of the continuous recording material in the intersecting direction and a cutting locus of a range of the area cut by the corresponding area cutting mechanism provide a side cutting locus, side cutting loci are not catenated toward the continuous recording material, a cutting locus of a range of the nick formed by each nick cutting mechanism except for the cutting mechanism disposed near to the side edge and a cutting locus of a range of the area cut by the corresponding area cutting mechanism provide a non-side cutting locus, and the non-side cutting loci provided by one set of the nick cutting mechanism and the corresponding area cutting mechanism are catenated toward the conveying direction.

12. The recording member cutting processing apparatus according to claim 8, wherein, one side of the first sides and another side of the first sides are arranged to line up on a straight line along the conveying direction, and the area cutting mechanism is configured to continuously cut one part of the continuous recording material along the one side and another part of the continuous recording material along the another side without the nick therebetween.

13. The recording member cutting processing apparatus according to claim 8, wherein, the first sides of the plurality of cutting areas are lined up on a straight line in the conveying direction from the most upstream side of the conveying direction toward the most downstream side thereof, the most upstream side of the conveying direction including the start point of one continuous recording material cutting job, and the most downstream side of the continuous recording material including the end point of the continuous recording material cutting job, the area cutting mechanism is configured to cut continuously the first sides of the plurality of cutting portions lined up on the straight line along the conveying direction without using the nick cutting mechanism.

14. The recording member cutting processing apparatus according to claim 8, wherein the second cutting device includes a temporary stop mechanism that temporarily stops the continuous recording material being conveyed, and the second cutting device cuts, when the continuous recording material is stopped by the temporary stop mechanism, the continuous recording material along each second side.

15. The recording member cutting processing apparatus according to claim 8, further including:

an image forming unit that forms an image on the continuous recording material, the image forming unit being disposed on an upstream side of the first cutting device in the conveying direction.

16. The recording member cutting processing apparatus according to claim 15, wherein the image forming unit forms, excepting image non-forming area, the image on image forming area, each image non-forming area extends over the entire area of the continuous recording material in the width direction thereof perpendicular to the conveying direction thereof, and each image forming are between the image non-forming areas mutually adjoining along the conveying direction.

* * * * *